United States Patent
Denman et al.

(10) Patent No.: US 11,557,098 B2
(45) Date of Patent: Jan. 17, 2023

(54) TECHNOLOGIES FOR TIME-DELAYED AUGMENTED REALITY PRESENTATIONS

(71) Applicant: Intel Corporation, Santa Clara, CA (US)

(72) Inventors: Pete A. Denman, Portland, OR (US); Glen J. Anderson, Beaverton, OR (US); Giuseppe Raffa, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/082,670

(22) Filed: Oct. 28, 2020

(65) Prior Publication Data

US 2021/0065456 A1 Mar. 4, 2021

Related U.S. Application Data

(63) Continuation of application No. 15/638,787, filed on Jun. 3, 2017, now Pat. No. 10,861,235.

(51) Int. Cl.
*G06T 19/00* (2011.01)
*G06F 9/54* (2006.01)
(Continued)

(52) U.S. Cl.
CPC .............. *G06T 19/006* (2013.01); *G06F 1/12* (2013.01); *G06F 3/011* (2013.01); *G06F 3/016* (2013.01); *G06F 9/542* (2013.01); *H04L 67/131* (2022.05); *H04L 67/52* (2022.05); *G06T 13/00* (2013.01); *G06T 2200/04* (2013.01);
(Continued)

(58) Field of Classification Search
None
See application file for complete search history.

(56) References Cited

U.S. PATENT DOCUMENTS 9,473,582 B1 10/2016 Fraccaroli
10,861,235 B2 12/2020 Denman et al.
(Continued)

OTHER PUBLICATIONS

United States Patent and Trademark Office, "Non Final Office Action," issued in connection with U.S. Appl. No. 15/638,787, dated Oct. 18, 2018, 18 pages.
(Continued)

*Primary Examiner* — Patrick F Valdez
(74) *Attorney, Agent, or Firm* — Hanley, Flight & Zimmerman, LLC

(57) ABSTRACT

Technologies for time-delayed augmented reality (AR) presentations includes determining a location of a plurality of user AR systems located within the presentation site and determining a time delay of an AR sensory stimulus event of an AR presentation to be presented in the presentation site for each user AR system based on the location of the corresponding user AR system within the presentation site. The AR sensory stimulus event is presented to each user AR system based on the determined time delay associated with the corresponding user AR system. Each user AR system generates the AR sensory stimulus event based on a timing parameter that defines the time delay for the corresponding user AR system such that the generation of the AR sensory stimulus event is time-delayed based on the location of the user AR system within the presentation site.

19 Claims, 8 Drawing Sheets

(51) Int. Cl.
  *G06F 1/12* (2006.01)
  *G06F 3/01* (2006.01)
  *H04L 67/52* (2022.01)
  *H04L 67/131* (2022.01)
  *G06T 13/00* (2011.01)
(52) U.S. Cl.
  CPC ...... *G06T 2200/28* (2013.01); *G06T 2210/28* (2013.01); *G06T 2219/024* (2013.01)

(56) References Cited

U.S. PATENT DOCUMENTS

| | | | |
|---|---|---|---|
| 2001/0025377 A1* | 9/2001 | Hinderks | H04N 21/4782 725/109 |
| 2005/0008171 A1 | 1/2005 | Hosoi et al. | |
| 2006/0223635 A1* | 10/2006 | Rosenberg | A63F 13/216 463/37 |
| 2009/0149202 A1 | 6/2009 | Hill et al. | |
| 2010/0034396 A1 | 2/2010 | Wollmershauser et al. | |
| 2010/0034404 A1 | 2/2010 | Dent | |
| 2010/0251173 A1 | 9/2010 | Imanishi | |
| 2013/0223631 A1 | 8/2013 | Greuet et al. | |
| 2013/0236040 A1 | 9/2013 | Crawford et al. | |
| 2015/0248161 A1* | 9/2015 | Komori | A63F 13/285 345/157 |
| 2015/0254947 A1* | 9/2015 | Komori | G06F 3/0346 340/407.1 |
| 2016/0205488 A1* | 7/2016 | Gomez | H04S 5/00 381/17 |
| 2017/0068268 A1 | 3/2017 | Giriyappa et al. | |
| 2017/0170918 A1* | 6/2017 | Nicolino, Jr. | H04L 65/80 |

OTHER PUBLICATIONS

United States Patent and Trademark Office, "Final Office Action," issued in connection with U.S. Appl. No. 15/638,787, dated May 23, 2019, 19 pages.

United States Patent and Trademark Office, "Advisory Action," issued in connection with U.S. Appl. No. 15/638,787, dated Oct. 9, 2019, 16 pages.

United States Patent and Trademark Office, "Non Final Office Action," issued in connection with U.S. Appl. No. 15/638,787, dated Dec. 23, 2019, 20 pages.

United States Patent and Trademark Office, "Notice of Allowance and Fee(s) Due," issued in connection with U.S. Appl. No. 15/638,787, dated Jun. 4, 2020, 24 pages.

* cited by examiner

TECHNOLOGIES FOR TIME-DELAYED AUGMENTED REALITY PRESENTATIONS

CROSS-REFERENCE TO RELATED APPLICATIONS

This patent arises from a continuation of U.S. patent application Ser. No. 15/638,787 (now U.S. Pat. No. 10,861,235), filed on Jun. 30, 2017, the contents of which are hereby incorporated herein by reference in their entirety for all purposes. Priority to U.S. patent application Ser. No. 15/638,787 is hereby claimed.

BACKGROUND

Augmented reality systems project virtual characters and objects onto physical locations, allowing for immersive experiences and novel interaction models. In some augmented reality systems, virtual characters or objects may be inserted into real-world images, for example by overlaying a captured image or video stream with a two- or three-dimensional animated rendering of the virtual character. In some implementations, a physical object recognized in the captured image may be replaced by a virtual object associated with that physical object. For example, recognized vehicles in the captured image may be recognized and replaced with animated vehicles (e.g., military vehicles, cartoon vehicles, etc.). Additionally, a user of the augmented reality system may be able to interact with the various virtual characters and/or objects.

Augmented reality experiences may be presented to multiple users in some cases. In such situations, each user is able to experience the same augmented reality. For example, a particular augmented reality presentation may include an augmented reality sensor stimulus event, such as a sound or tactile vibration, which is experienced by each of the augmented reality participants. In typical augmented reality systems, however, each participant experiences the augmented reality presentation and stimuli in the same time frame, which can lower the effect of immersion felt by the participants as a group.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
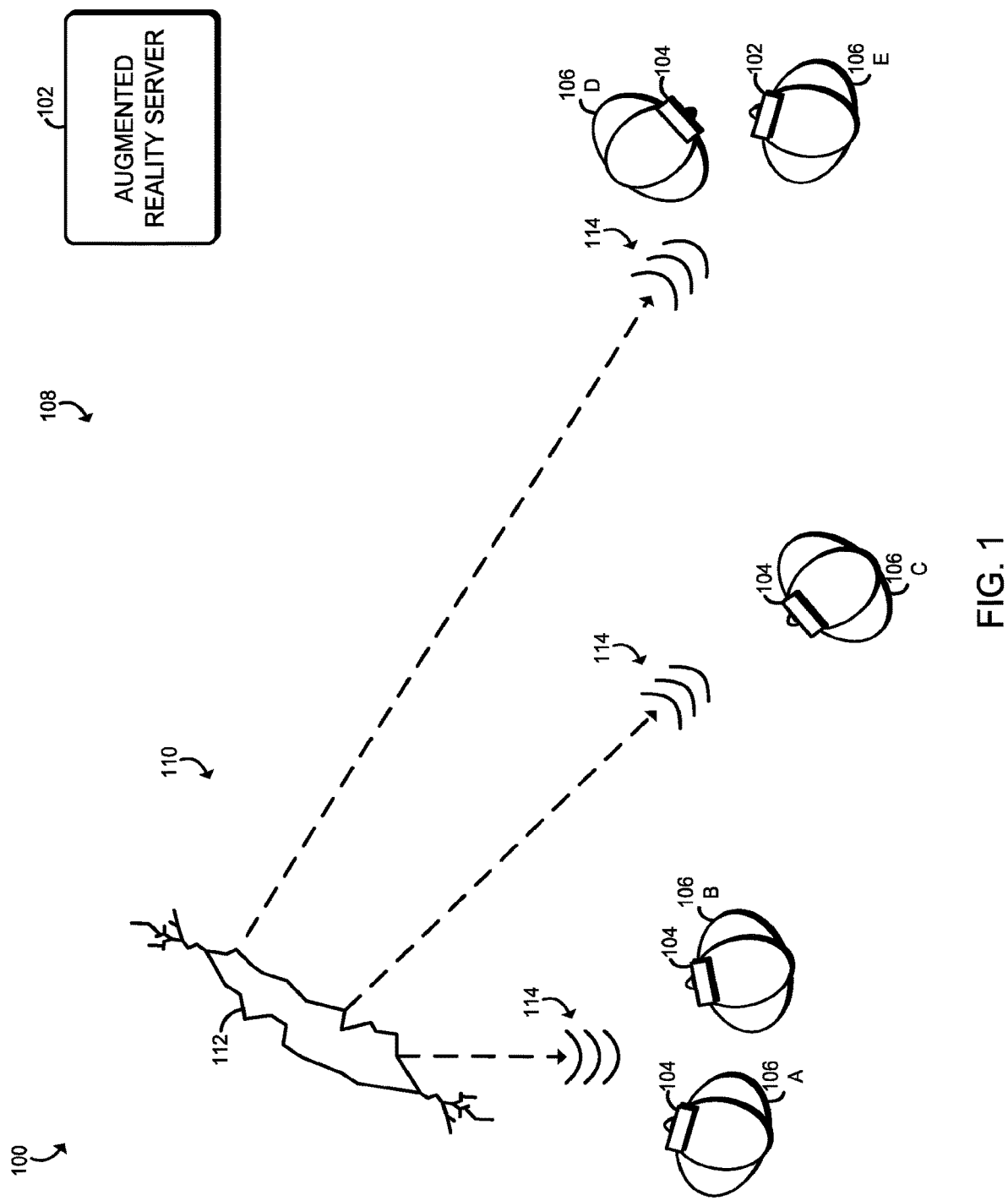
FIG. 1 is a simplified diagram illustrating a time-delayed augmented reality stimulus event presented by an augmented reality server and experienced by multiple users of user augmented reality systems within a presentation site.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for presenting a time-delayed augmented reality (AR) presentation includes an AR server 102 and multiple user AR systems 104, which are used, worn, or otherwise operated by users 106 within a presentation site 108 at which the time-delayed AR presentation is to be presented. In use, as discussed in more detail below, the AR server 102 is configured to identify AR sensory stimulus events of the AR presentation, such as audible, visual, or tactile AR stimulus events (or a combination thereof), and delay the generation of those AR sensory stimulus events on the individual user AR systems 104 based on the location of each user AR system 104. In the example shown in FIG. 1, for example, the augmented reality server 102 is presenting an AR presentation 110 that includes a visual AR stimulus event 112 embodied as an AR earthquake crack appearing on the ground of the presentation site 108. As such, each user 106 is able to see the visual AR stimulus event 112 via their user AR system 104. In addition to the visual AR stimulus event 112, the presentation includes an audible AR stimulus event 114, such as a loud cracking sound. However, the audible AR stimulus event 114 is delayed for each user 106 based on the distance of that particular user 106 from the visual AR stimulus event 112. That is, the user AR system 104 of each user 106 generates the audible AR stimulus event 114 in a time-delayed manner. As such, the users 106A and 106B experience the audible AR stimulus event 114 before the user 106C, who experiences the audible AR stimulus event 114 before users 106D and 106E. By time delaying the AR sensory stimulus events, the system 100 allows for new AR experience modalities. For example, because users 106A and 106B experience the audible AR stimulus event 114 (e.g., a loud cracking sound) before users 106D and 106E, users 106A and 106B may react to the AR presentation 110 before users 106D and 106E, who are not in a position to see the visual AR stimulus event 112. The users 106D and 106E may become aware of the visual AR stimulus event 112 in response to the reactions of users 106A and 106B. In some embodiments, the time delay of between the visual AR stimulus event 112 and the audible AR stimulus event 114 may be based on the physical distance from the visual AR stimulus event 112 of the particular user, along with the applicable laws of physics. For example, in some embodiments, the audible AR stimulus event 114 may be experienced (i.e., hears) later by a particular user than that particular user experiences (e.g., sees) the visual AR stimulus event 112 due to the difference in speeds of sound and light.

Additionally, it should be appreciated that the impact of distance within a particular AR presentation may be increased by artificially increasing the time-delay of associated AR sensory stimulus events. For example, the audible AR stimulus event 114 experienced by the users 106D and 106E of FIG. 1 may be time-delayed for an amount that is greater that the audible delay that the distance between the users 106D and 106E and the visual AR stimulus event 112 would cause in the real world. In this way, the sense and/or impact of distance in AR presentations may be increased because, for example, the user 106E may be able to see the reaction of the user 106D before seeing the visual AR stimulus event 112 and, therefore, react to both the AR presentation and the reactions of the user 106D.

Figure 2:
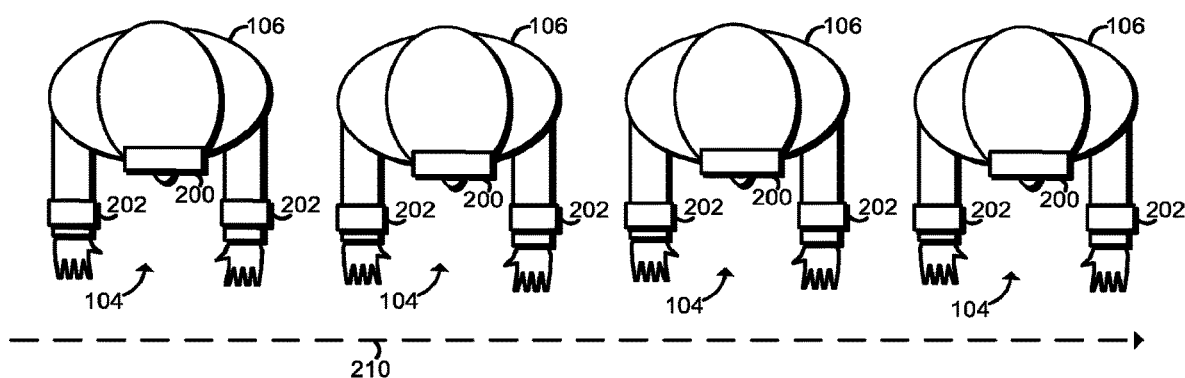
FIG. 2 is simplified diagram illustrating another embodiment of a time-delayed augmented reality stimulus event experienced by multiple users of user augmented reality systems.

By delaying the generation of AR sensory stimulus events across multiple user AR systems 104, the AR server 102 may also create a sense of direction in groups of users 106 of the user AR systems 104. For example, in some embodiments as shown in FIG. 2, each user AR system 104 may include a pair of AR goggles 200 and a pair of AR wrist bands 202, which may provide a tactile feedback to the user. In such embodiments, the AR server 102 may cause an AR sensory stimulus event 210, such as an AR tactile stimulus event, to be generated by the user AR systems 104 in a time-delayed manner such that the AR sensory stimulus event 210 propagates down the line of users. Each user experiences the AR sensory stimulus event 210 on AR wrist band 202 of their right arm first, followed by the AR wrist band 202 on their left arm. In this way, the users 106 experience the AR tactile stimulus event as originating from the right of them and propagating toward the left of them. Such time-delayed experiences may be used to create an AR wave of experiences in large groups, such as stadium crowds.

Figure 3:
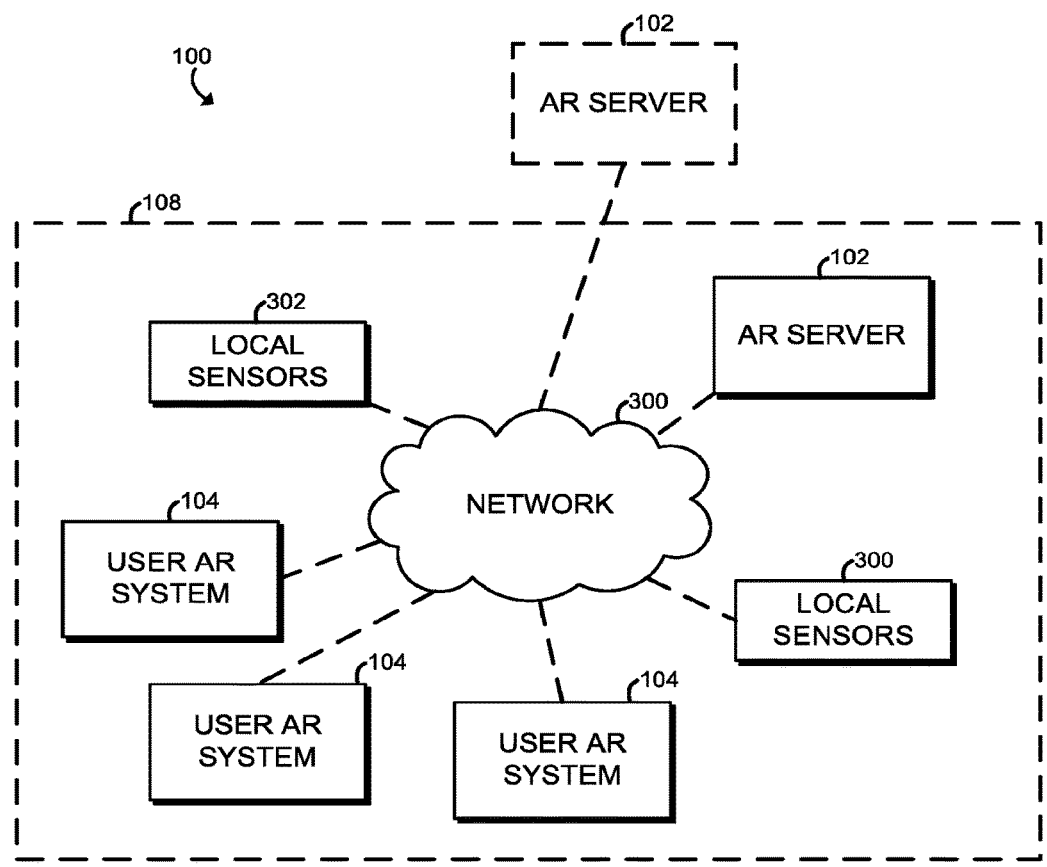
FIG. 3 is a simplified block diagram of at least one embodiment of an augmented reality system for presenting time-delayed augmented reality stimulus events.

Referring now to FIG. 3, the illustrative system 100 includes the AR server 102 and multiple user AR systems 104, which are worn by users 106 within the presentation site 108 wherein an AR presentation is to be presented by the AR server 102. The AR server 102 and each of the user AR systems 104 are communicatively coupled via a network 300. In use, as discussed in more detail below, the AR server 102 may transmit AR presentations and/or AR sensory stimulus events to the user AR systems 104 via the network 300. Similarly, each user AR system 104 may transmit reaction data to the AR server 102 indicative of a user's reaction to AR sensory stimulus events.

The network 300 may be embodied as any type of network capable of facilitating communications between the AR server 102 and the user AR systems 104. For example, the network 300 may be embodied as, or otherwise include, a wired or wireless local area network (LAN), a wired or wireless wide area network (WAN), a cellular network, and/or a publicly-accessible, global network such as the Internet. As such, in some embodiments, the network 300 may include additional devices, such as additional computers, routers, and switches, to facilitate communications thereacross.

In some embodiments, the AR server 102 may be located within the presentation site 108. However, in other embodiments, the AR server 102 may be located remotely from the presentation site 108. The system 100 may also include one or more local sensors 302 located within the presentation site to monitor the users of the user AR systems 104. For example, the local sensors 302 may produce sensor data indicative of the location of the users within the presentation site and/or of reactions of the users to the AR sensory stimulus events. As such, the local sensors 302 may be embodied as any type of sensor capable of producing sensor data indicative of a characteristic or action of the users including, but not limited to, cameras, microphones, temperature sensors, motion sensors, proximity sensors, and/or other types of sensors.

Figure 4:
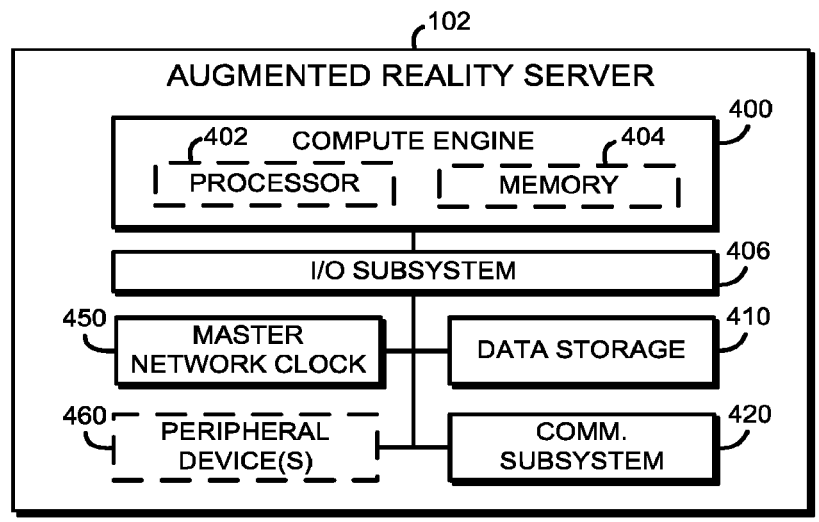
FIG. 4 is a simplified block diagram of at least one embodiment of an augmented reality server of the augmented reality system of FIG. 3.

Referring now to FIG. 4, the AR server 102 may be embodied as any type of server or other compute device capable of presenting AR presentations to the user AR systems 104 and performing the functions described herein. For example the AR server 102 may be embodied as, without limitation, one or more server computers, distributed computing systems, workstations, computers, desktop computers, laptop computers, notebook computers, tablet computers, mobile computing devices, network appliances, web appliances, processor-based systems, consumer electronic devices, and/or other compute devices. As such, it should be appreciated that although shown in FIGS. 1, 3, and 4 as a single compute device, the AR server 102 may be embodied as multiple compute devices (e.g., distributed compute devices) in other embodiments.

As shown in FIG. 4, the illustrative AR server 102 includes a compute engine 400, an input/output ("I/O") subsystem 406, a data storage 410, a communication subsystem 420, and a master network clock 450. Of course, it should be appreciated that the AR server 102 may include other or additional components, such as those commonly found in a typical compute device (e.g., various input/output devices and/or other components), in other embodiments. Additionally, in some embodiments, one or more of the illustrative components may be incorporated in, or otherwise form a portion of, another component.

The compute engine 400 may be embodied as any type of device or collection of devices capable of performing various compute functions as described below. In some embodiments, the compute engine 400 may be embodied as a single device such as an integrated circuit, an embedded system, a field-programmable-array (FPGA, a system-on-a-chip (SOC), or other integrated system or device. Additionally, in some embodiments, the compute engine 400 includes or is embodied as a processor 402 and memory 404. The processor 402 may be embodied as any type of processor capable of performing the functions described herein. For example, the processor 402 may be embodied as a single or multi-core processor(s), digital signal processor, microcontroller, or other processor or processing/controlling circuit. Similarly, the memory 404 may be embodied as any type of volatile or non-volatile memory or data storage capable of performing the functions described herein. In operation, the memory 404 may store various data and software used during operation of the AR server 102 such as operating systems, applications, programs, libraries, and drivers.

The compute engine 400 is communicatively coupled to other components of the AR server 102 via the I/O subsystem 406, which may be embodied as circuitry and/or components to facilitate input/output operations with compute engine 400 (e.g., with the processor 402 and/or memory 404) and other components of the AR server 102. For example, the I/O subsystem 406 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 406 may be incorporated, along with the processor 402, the 404, and other components of the AR server 102, into the compute engine 400.

The data storage 410 may be embodied as any type of device or devices configured for short-term or long-term storage of data such as, for example, memory devices and circuits, memory cards, hard disk drives, solid-state drives, or other data storage devices. As discussed in detail below, the AR server 102 may store AR presentations, which may include time-delayed AR sensory stimulus event for presentation to the user AR systems 104 of users in the presentation site 108, along with other data.

The communication subsystem 420 may be embodied as any type of communication circuit, device, or collection thereof, capable of enabling communications between the AR server 102 and user AR systems 104 via the network 300. To do so, the communication subsystem 420 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The master network clock 450 may be embodied as any type of device, circuit, and/or collection of devices or circuits capable of generating a clock signal usable by other components of the AR server 102. For example, the master network clock 450 may be embodied as, or otherwise include, a crystal oscillator-based circuit and may generate a clock signal of any suitable type such as square wave or a sine wave. As discussed in more detail below, the master network clock 450 is used to synchronize local clocks of the user AR systems 104 so that the time-delayed AR sensory stimulus events can be generated at the appropriate time across the various users.

In some embodiments, the AR server 102 may also include one or more peripheral devices 460. The peripheral devices 460 may include any number of additional peripheral or interface devices, such as other input/output devices, storage devices, and so forth. The particular devices included in the peripheral devices 460 may depend on, for example, the type and/or configuration of the AR server 102.

Figure 5:
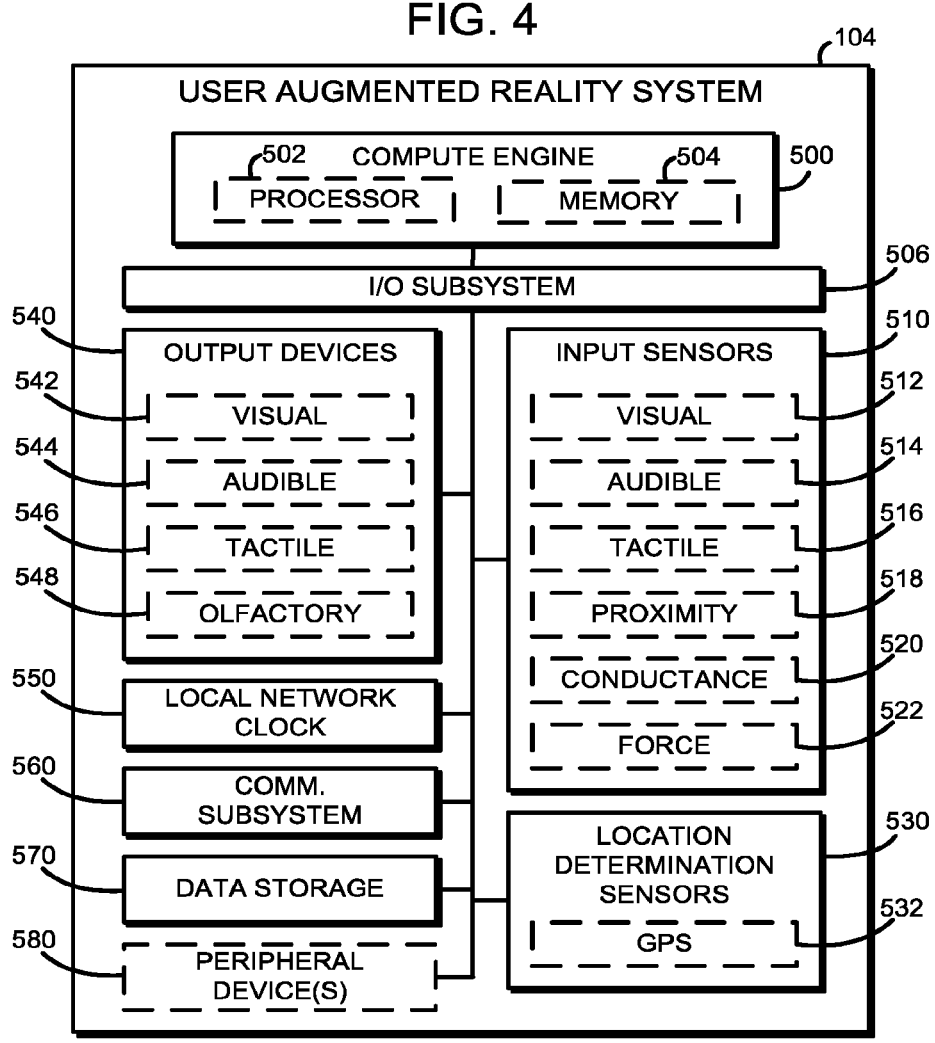
FIG. 5 is a simplified block diagram of at least one embodiment of a user augmented reality system of the augmented reality system of FIG. 3.

Referring now to FIG. 5, each user AR system 104 may be embodied as any type of augmented reality device or collection of devices. In some embodiments, the user AR system 104 may be embodied as a single device or interconnected devices that form an AR system. However, in other embodiments, the user AR system 104 may be embodied as individual AR devices that may have little or no communication between each other but are configured to receive AR presentations, including AR sensory stimulus events, from the AR server 102. In some embodiments, the user AR system 104 may be embodied as an AR wearable system designed to be worn by the user such as, for example, an AR eyewear, an AR earpiece, and AR vest, an AR bracelet, AR-enable accessories, AR-enabled clothing, and/or other AR wearable devices or systems. In other embodiments, the user AR system 104 may embodied as an AR device usable by the user to experience an AR sensory stimulus event such as, for example, a smartphone, tablet compute device, laptop compute device, or other non-wearable AR device or collection of devices capable of generating AR sensory stimulus events.

The illustrative user AR system of FIG. 5 includes a compute engine 500, an input/output ("I/O") subsystem 506, one or more input sensors 510, one or more location determination sensors 530, one or more output devices 540, a local network clock 550, a communication subsystem 560, and a data storage 570. Of course, it should be appreciated that the user AR system 104 may include other or additional components, such as those commonly found in an AR device (e.g., various input/output devices and/or other components), in other embodiments. Additionally, in some embodiments, one or more of the illustrative components may be incorporated in, or otherwise form a portion of, another component.

The compute engine 500 may be embodied as any type of device or collection of devices capable of performing various compute functions as described below. In some embodiments, the compute engine 500 may be embodied as a single device such as an integrated circuit, an embedded system, a field-programmable-array (FPGA, a system-on-a-chip (SOC), or other integrated system or device. Additionally, in some embodiments, the compute engine 500 includes, or is embodied as, a processor 502 and memory 504. The processor 502 may be embodied as any type of processor capable of performing the functions described herein. For example, similar to processor 402, the processor 502 may be embodied as a single or multi-core processor(s), digital signal processor, microcontroller, or other processor or processing/controlling circuit. Similarly, the memory 504 may be embodied as any type of volatile or non-volatile memory or data storage capable of performing the functions described herein. In operation, the memory 504 may store various data and software used during operation of the user AR system 104 such as operating systems, applications, programs, libraries, and drivers.

The compute engine 400 is communicatively coupled to other components of the user AR system 104 via the I/O subsystem 506, which may be embodied as circuitry and/or components to facilitate input/output operations with compute engine 500 (e.g., with the processor 502 and/or memory 504) and other components of the user AR system 104. For example, the I/O subsystem 506 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 506 may be incorporated, along with the processor 502, the 504, and other components of the user AR system 104, into the compute engine 500.

The input sensors 510 may be embodied as any number of any type of sensors capable of producing data indicative of a reaction of a user of the user AR system 104 to one or more AR sensory stimulus events (e.g., an audible, visual, tactile, heat, or olfactory stimulus event). For example, in some embodiments, the input sensors 510 may include one or more visual input sensors 512. Each visual input sensor 512 may be embodied as any type of sensor capable capturing images of the user and/or the user's surroundings, such as a camera, image sensor, and/or the like. Additionally, in some embodiments, the input sensors 510 may include one or more audible input sensors 514. Each audible input sensor 514 may be embodied as any type of sensor capable capturing audio or sounds of the user and/or the user's surrounding, such as a microphone, ear microphone, and/or the like. In some embodiments, the input sensors 510 may also include one or more tactile input sensors 516. Each tactile input sensor 516 may be embodied as any type of sensor capable capturing user tactile interaction, such as a touch sensor or the like. The input sensors 510 may also include one or more proximity input sensors 518. Each proximity input sensor 518 may be embodied as any type of sensor capable capturing sensor data indicative of the proximity of the user to other users and/or structures, such as an electromagnetic sensor, photoelectric sensor, and/or the like. Additionally, in some embodiments, the input sensors 510 may include one or more conductance input sensors 520. Each conductance input sensor 520 may be embodied as any type of sensor capable capturing a skin response or the like of the user, such as a galvanic skin response (GSR) sensor, an electrodemeral response (EDR), a skin conductance response (SCR) sensor, and/or the like. In some embodiments, the input sensors 510 may also include one or more force input sensors 522. Each force input sensor 522 may be embodied as any type of sensor capable measuring an amount of force applied by the user such as a strain gauge, load cell, and/or the like.

The location determination sensors 530 may be embodied as any type of sensor or collection of sensor capable of producing sensor data indicative of the location of the user AR system 104 within the presentation site 108. To do so, the location determination sensors 530 may utilize any suitable technology to determine the location of the user AR system 104. For example, the location determination sensors 530 may include a WiFi or Bluetooth sensor to facilitate the triangulation or trilateration of the location of the user AR system 104 within the presentation site. Additionally or alternatively, in some embodiments, the location determination sensors 530 may include a global positioning system (GPS) circuit 532 configured to determine the location of the user AR system 104 based on received GPS signals.

The output devices 540 may be embodied as any number of any type of devices or circuits capable of producing a sensory stimulus (e.g., e.g., an audible, visual, tactile, heat, or olfactory output) to the user of the user AR system 104. For example, in some embodiments, the output devices 540 include one or more visual output devices 542 to display a visual stimulus, such as a display, projector, and/or the like. Additionally, the output devices 540 may include one or more audible output devices 544 to generate an audible stimulus, such as a speaker, an ear transducer, and/or the like. The output devices 540 may also include one or more tactile output devices 546 to generate a tactile or haptic stimulus, such as a vibrator, motor, and/or the like 540. Additionally, the output devices 540 may include one or more olfactory output devices 548 to generate an olfactory stimulus, such as an odor producing device or system.

The network clock 550 may be similar to the master network clock 450 and may be embodied as any type of device, circuit, and/or collection of devices or circuits capable of generating a clock signal usable by other components of the user AR system 104. For example, the network clock 550 may be embodied as, or otherwise include, a crystal oscillator-based circuit and may generate a clock signal of any suitable type such as square wave or a sine wave. As discussed in more detail below, the network clock 550 is synchronized with the master network clock 450 of the AR server 102 so that the user AR system 104 may generate the time-delayed AR sensory stimulus events at a time designated by the AR server 102.

The communication subsystem 560 may be embodied as any type of communication circuit, device, or collection thereof, capable of enabling communications between the user AR systems 104 and the AR server 102 and/or other user AR systems 104 via the network 300. To do so, the communication subsystem 560 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The data storage 570 may be embodied as any type of device or devices configured for short-term or long-term storage of data such as, for example, memory devices and circuits, memory cards, hard disk drives, solid-state drives, or other data storage devices. As discussed in detail below, the user AR system 104 may store AR presentations, which may include time-delayed AR sensory stimulus events, received from the AR server 102.

In some embodiments, the user AR system 104 may also include one or more peripheral devices 580. The peripheral devices 580 may include any number of additional peripheral or interface devices, such as other input/output devices, storage devices, and so forth. The particular devices included in the peripheral devices 580 may depend on, for example, the type and/or configuration of the user AR system 104.

Figure 6:
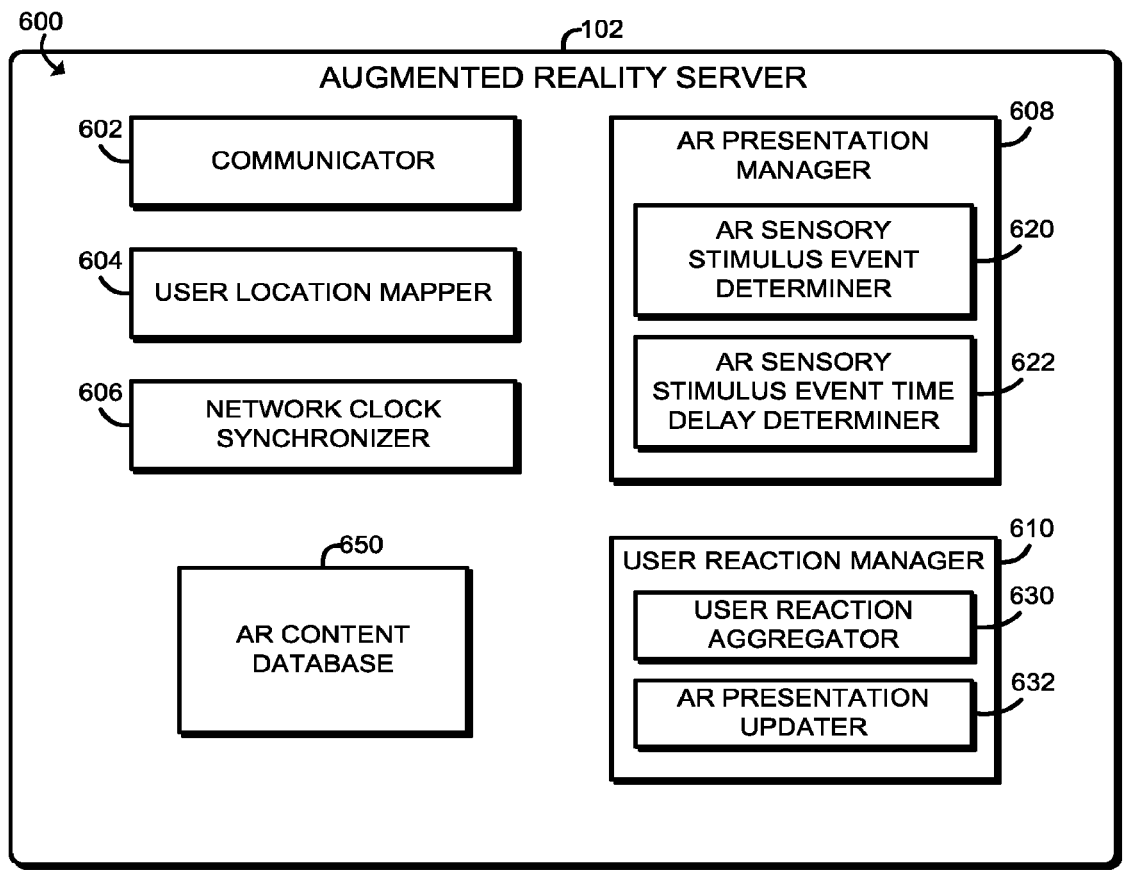
FIG. 6 is a simplified block diagram of at least one embodiment of an environment of the augmented reality server of FIG. 4.

Referring now to FIG. 6, in illustrative embodiment, the AR server 102 may establish an environment 600 during operation. The illustrative environment 600 includes a communicator 602, a user location mapper 604, a network clock synchronizer 606, an AR presentation manager 608, and a user reaction manger 610. Each of the components of the environment 600 may be embodied as hardware, firmware, software, or a combination thereof. As such, in some embodiments, one or more of the components of the environment 600 may be embodied as circuitry or a collection of electrical devices (e.g., communication circuitry 602, a user location mapper circuit 604, a network clock synchronizer circuit 606, an AR presentation manner 608, and a user reaction manger 610). It should be appreciated that, in such embodiments, one or more of the communication circuitry 602, the user location mapper circuit 604, the network clock synchronizer 606, the AR presentation manner 608, and the user reaction manger 610 may form a portion of one or more of the compute engine 400, the I/O subsystem 406, and/or other components of the AR server 102.

The communicator 602 is configured to manage communications between the AR server 102 and the various user AR systems 104 located within the presentation site 108. For example, as discussed in more detail below, the communicator 602 may control the communication subsystem 420 to transmit AR presentations including time-delayed AR sensory stimulus events to the user AR systems 104 and receive user reaction data from the user AR systems 104 over the network 300. To do so, the communicator 602 utilize any one or more communication technologies (e.g., wireless or wired communications) and associated protocols (e.g., Ethernet, Bluetooth®, Wi-Fi®, WiMAX, LTE, 5G, etc.) to effect such communication.

The user location mapper 604 is configured to determine the location of each participating user AR system 104 (e.g., the location of each user 106) within the presentation site 108. To do so, in some embodiments, the user location mapper 604 may query the user AR systems 104 for location data indicative of their present location within the presentation site 108. Such location data may be an absolute location value, such as a GPS location, or a relative location value such as location data indicative of the location of the user relative to a known position or device within the presentation site (e.g., relative to a communication node or WiFi hotspot). Additionally or alternatively, in some embodiments, the user location mapper 604 may be configured to utilize sensor data received from one or more local sensors 302 located within the presentation site 108 to infer or otherwise determine the location of each user AR system 104. For example, the user location mapper 604 may analyze images received from one or more local camera sensors 302 to determine the relative location of the users 106 within the presentation site. Further, in some embodiments, the user location mapper 604 may also query each identified user AR system 104 to determine whether the user 106 desires to participate in the AR presentation at that particular presentation site 108.

The network clock synchronizer 606 is configured to synchronize the network clocks 550 of each user AR system 104 with the master network clock 450 of the AR server 102. To do so, in some embodiments, the AR server 102 may transmit clock information to each user AR system 104. Such clock information may be indicative of the timing of the master network clock 450 or otherwise usable by the user AR system 104 to synchronize its network clock 550 with the master network clock 450. In other embodiments, each user AR system 104 may initially send clock information indicative of the timing of its network clock 550 to the AR server 102, and the AR server 102 may utilize the clock information for each user AR system 104 to determine a timing offset to apply to each particular user AR system 104 so as to synchronize the timing between the master network clock 450 and the network clocks 550 of the user AR systems 104.

The AR presentation manager 608 is configured to manage and present the time-delayed AR presentations to the user AR systems 104 located within the presentation site 108. To do so, the AR presentation manager 608 includes an AR sensory stimulus event determiner 620 configured to identify AR sensory stimulus events of an AR presentation to be presented at the presentation site 108. For example, in some embodiments, AR presentation may include data tags or identifiers that identify AR sensory stimulus events of the AR presentation that can be time-delayed. In such embodiments, the AR sensory stimulus event determiner 620 may analyze the AR presentation to identify each of the data tags and associated AR sensory stimulus events. In other embodiments in which the AR presentation does not include such data tags or identifiers, the AR sensory stimulus event determiner 620 may analyze the AR presentation itself and infer or otherwise identify one or more AR sensory stimulus events based on such analysis. To do so, the AR sensory stimulus event determiner 620 may utilize any suitable algorithm or analysis to identify the AR sensory stimulus events that can be time-delayed. For example, the AR sensory stimulus event determiner 620 may identify abrupt changes of sensory stimulus present in the AR presentation such as, for example, an abrupt change in volume (which may be indicative of an explosion or the like), an abrupt scene change (which may be indicative of an important event), and/or the like. Furthermore, in those AR presentations including visual data, the AR sensory stimulus event determiner 620 may utilize various image recognition algorithms to identify known visual stimulus that can be time delayed included in the AR presentation.

After the AR sensory stimulus event determiner 620 has identified the AR sensory stimulus events of the AR presentation that can be time-delayed, the AR sensory stimulus event time delay determiner 622 determines an associated time delay for each identified time-delayed AR sensory stimulus event. To do so, in some embodiments, the AR sensory stimulus event time delay determiner 622 may determine a value of a time delay based on the location of each user AR system 104 (i.e., the location of each user 106) within the presentation site 108 as determined by the user location mapper 604. As discussed above, the location of each user AR system 104 may be an absolute position (e.g., GPS coordinates) or relative to each other or another fixed location (e.g., relative to a location at which an AR sensory stimulus event is to occur). For example, in some embodiments, the AR sensory stimulus event time delay determiner 622 may apply a time delay that is increased based on the distance of the respective user AR system 104 to a reference location within the presentation site 108. In other embodiments, the AR sensory stimulus event time delay determiner 622 may logically divide the presentation site 108 into various zones (e.g., relative to a reference location) and apply time delays on a zone-by-zone basis (i.e., all user AR systems 104 within the same zone are assigned the same time delay), rather than on a per-user AR system 104 basis (i.e., based only on the location of each user AR system 104).

The particular values of the time delay may depend on various factors such as, for example, the type of AR sensory stimulus event to be time delayed, the size of the presentation site 108, the number of participating user AR systems 104, laws of physics for a particular AR sensory stimulus, and/or other criteria. Additionally, the particular time delay value may be determined relative to the synchronized master network clock 450 or may be determined relative to the network clock 550 of the corresponding user AR system 104 as discussed in more detail below.

After the AR sensory stimulus event time delay determiner 622 has determined the time delays for each identified AR sensory stimulus event and each user AR system 104, the AR presentation manager 608 is configured to present the time-delayed AR presentation to the participating users located within the presentation site 108. That is, the AR presentation manager 608 presents the identified sensory stimulus events of the time-delayed AR presentation to the users of the user AR systems 104 in a time-delayed manner. To do so, in the illustrative embodiment, the AR presentation manager 608 appends, incorporates, or otherwise associates a timing parameter with each AR sensory stimulus event to be time delayed. The timing parameter is indicative of the corresponding timing delay determined for the particular time-delayed AR sensory stimulus event and for the particular user AR system 104, and is usable by the corresponding user AR system 104 to determine when (i.e., at what time) to present the time-delayed AR sensory stimulus event to the user. As discussed above, the timing parameter may be relative to the master network clock 450 or the network clock 550 of the corresponding user AR system 104. The AR presentation manager 608 may subsequently transmit the time-delayed AR sensory stimulus event with the associated timing parameter to the corresponding user AR system 104. Because the time-delayed AR sensory stimulus event includes the timing parameter, the AR presentation manager 608 may transmit the time delayed AR sensory stimulus event prior to its presentation by each user AR system (e.g., during a presentation initialization period). For example, in some embodiments, the AR presentation manager 608 transmits the time-delayed AR sensory stimulus events, with the timing parameters, as part of the overall AR presentation sent to each user AR system 104.

In other embodiments, the AR presentation manager 608 may transmit the time-delayed AR sensory stimulus event in real time. In such embodiments, a timing parameter is not associated with each time-delayed AR sensory stimulus event. Rather, the AR presentation manager 608 transmits the AR sensory stimulus event at a transmission time that is based on the delay time determined for that particular AR sensory stimulus event and the particular user AR system 104 receiving the time-delayed AR sensory stimulus event. In such embodiments, the user AR system 104 may immediately or responsively present the corresponding AR sensory stimulus event to produce a relative time-delayed AR sensory stimulus event (i.e., relative to other user AR systems 104).

The user reaction manager 610 is configured to obtain reaction data indicative of a reaction of the users to one or more time-delayed stimulus events and update the AR presentation (e.g., a time-delayed stimulus event) based on such reaction data. To do so, the user reaction manager 610 includes a user reaction aggregator 630 and an AR presentation updater 632. The user reaction aggregator 630 is configured to obtain user reaction data indicative of a reaction of each user of an user AR system 104 to a time-delayed AR sensory stimulus event. To do so, in some embodiments, the user reaction aggregator 630 may receive the user reaction data from each participating user AR system 104. For example, each user AR system 104 may be configured to transmit user reaction data in response to the presentation of a time-delayed sensory stimulus event on the corresponding user AR system 104. In other embodiments, the AR server 102 may transmit a query to each user AR system 104 requesting the user reaction data. Additionally, in embodiments in which the system 100 incudes the local sensor 302 in the presentation site 108, the user reaction aggregator 630 may receive user reaction data from the local sensors 302. As discussed above, the user reaction data may be embodied as any type of data indicative of a user's reaction to the time-delayed AR sensory stimulus event such as, for example, visual reaction data, audible reaction data, tactile reaction data, conductance reaction data, force reaction data, movement reaction data, and/or other types of reaction data.

In some embodiments, the user reaction aggregator 630 is configured to aggregate the various user reaction data received from the user AR systems 104 and/or the local sensors 302. For example, the user reaction aggregator 630 may analyze the aggregate user reaction data to infer or otherwise determine a reaction of each user (e.g., was the particular user surprised, upset, scared, etc.). To do so, the user reaction aggregator 630 may utilize any suitable analysis algorithm or methodology depending on, for example, the type of reaction data (e.g., an image analysis algorithm may be used to interpret visual reaction data).

The AR presentation updater 632 is configured to update the AR presentation based on the aggregated user reaction data. To do so, in the illustrative embodiment, the AR presentation updater 632 may adjust or update the time delay associated with the particular AR sensory stimulus event. For example, the AR presentation updater 632 may increase or decrease the timing delay for the AR sensory stimulus event associated with a particular user AR system 104.

The AR server 102 may also maintain an AR content database 650, which may be embodied as any type of database, storage location, or other collection of AR presentations. The AR content database 650 may store AR presentations that have yet to be analyzed for AR sensory stimulus events that can be delayed, as well as AR presentations that have been successfully analyzed and updated. For example, after the AR presentation manager 608 identifies one or more AR sensory stimulus events of an AR presentation and associates a timing delay (e.g., a timing parameter) with each AR sensory stimulus event, the time-delayed AR presentation may be subsequently stored in the AR content database 650. Additionally or alternatively, in some embodiments, individual time-delayed AR sensory stimulus events may be stored in the AR content database with or without an associated AR presentation.

Figure 7:
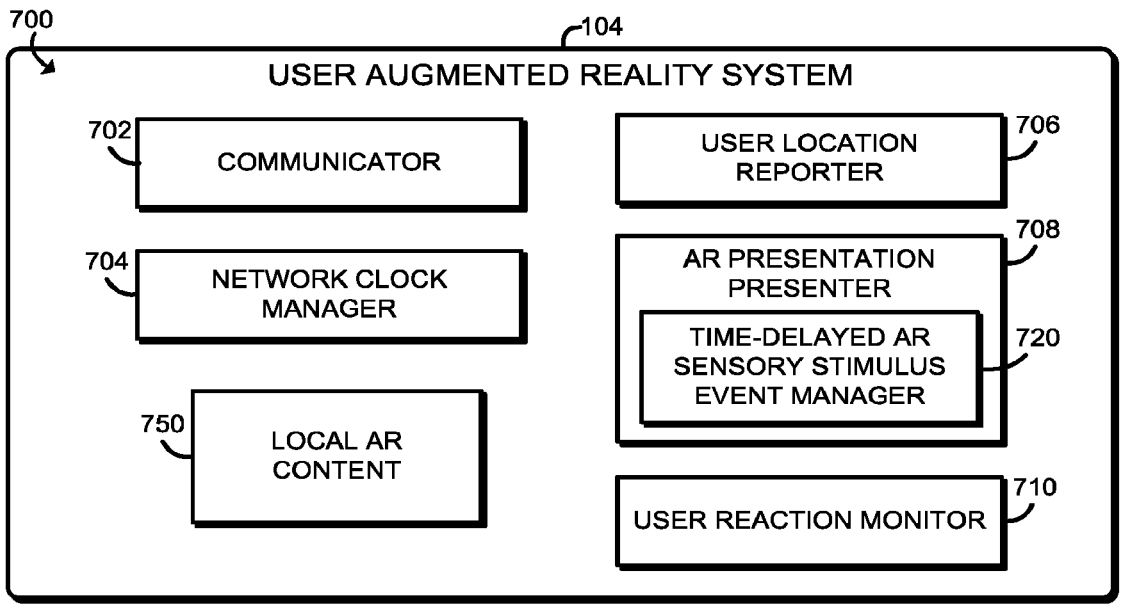
FIG. 7 is a simplified block diagram of at least one embodiment of an environment of the user augmented reality system of FIG. 4.

Referring now to FIG. 7, in illustrative embodiment, each user AR system 104 may establish an environment 700 during operation. The illustrative environment 700 includes a communicator 702, a network clock manager 704, a user location reporter 706, an AR presentation presenter 708 and a user reaction monitor 710. Each of the components of the environment 700 may be embodied as hardware, firmware, software, or a combination thereof. As such, in some embodiments, one or more of the components of the environment 700 may be embodied as circuitry or a collection of electrical devices (e.g., communication circuitry 702, a network clock manager circuit 704, a user location reporter circuit 706, an AR presentation presenter circuit 708, and a user reaction monitor circuit 710). It should be appreciated that, in such embodiments, one or more of the communication circuitry 702, the network clock manager circuit 704, the user location reporter circuit 706, the AR presentation presenter circuit 708, and the user reaction monitor 710 may form a portion of one or more of the compute engine 500, the I/O subsystem 506, and/or other components of the user AR system 104.

The communicator 702 is configured to manage communications between the user AR system 104 and the AR server 102. For example, as discussed below, the communicator 702 may control the communication subsystem 560 to receive AR presentations including time-delayed AR sensory stimulus events from the AR server 102 and transmit user reaction data to the AR server 102 over the network 300. To do so, the communicator 702 may utilize any one or more communication technologies (e.g., wireless or wired communications) and associated protocols (e.g., Ethernet, Bluetooth®, Wi-Fi®, WiMAX, LTE, 5G, etc.) to effect such communication.

The network clock manager 704 is configured to synchronize the local network clock 550 with the master network clock 450 of the AR server. To do so, as discussed above, the user AR system 104 may receive clock information from the AR server 102 that is indicative of a timing of the master network clock 450 or is otherwise usable by the network clock manager 704 to synchronize the local network clock 550 with the master network clock 450. Alternatively, in other embodiments, the network clock manager 704 may initially transmit clock information indicative of the timing of the local network clock 550 of the AR server 102, which may be used by the AR server 102 to determine a timing offset for the particular user AR system 104 when generating timing delay information.

The user location reporter 706 is configured to respond to location queries received from the AR server 102. In response, the user location reporter 706 is configured to transmit location data indicative of the present location of the user AR system 104 within the presentation site. To do so, the user location reporter 706 may determine the location of the user AR system 104 based on the sensor data produced by the location determination sensors 530. As discussed above, the location data may be an absolute location value, such as a GPS location, or a relative location value such as location data indicative of the location of the user AR system 104 relative to known position or device within the presentation site (e.g., relative to a communication node or WiFi hotspot.)

The AR presentation presenter 708 is configured to receive an AR presentation from the AR server 102 and present the AR presentation to a user of the user AR system 104. To do so, the AR presentation presenter 708 includes a time-delayed AR sensory stimulus event manager 720, which is configured to manage the presentation of the time-delayed sensory stimulus events included in or associated with an AR presentation. That is, the time-delayed AR sensory stimulus event manager 720 is configured to present the time-delayed sensory stimulus events to a user of the user AR system 104 in a time-delayed manner. For example, in embodiments wherein each time-delayed AR sensory stimulus event includes a timing parameter associated therewith, the time-delayed AR sensory stimulus event manager 720 may present the associated time-delayed AR sensory stimulus event based on the timing parameter. That is, the timing parameter defines the time at which to present the associated AR sensory stimulus event relative the network clock 550 of the user AR system 104, which may or may not have been synchronized with the master network clock 450. In other embodiments, as discussed above, the AR server 102 may transmit the AR sensory stimulus events at the delayed time at which it is to be presented by the user AR system 104. In such embodiments, the AR presentation presenter 708 is configured to present the AR sensory stimulus event upon receipt, which has been artificially delayed by the AR server 102 as discussed above.

The user reaction monitor 710 is configured to determine the user's reaction to a time-delayed AR sensory stimulus event and transmit user reaction data indicative of such reaction to the AR server 102. To do so, the user reaction monitor 710 may monitor sensor data produced by any one or more of the input sensors 510, aggregate the sensor data, and transmit the captured sensor data to the AR server 102. The user reaction monitor 710 may be configured to transmit the user reaction data in response to presenting the time-delayed AR sensory stimulus event or in response to a query received from the AR server 102. As discussed above, the user reaction data may be embodied as any type of data indicative of a user's reaction to the time-delayed AR sensory stimulus event including, but not limited to, visual reaction data, audible reaction data, tactile reaction data, conductance reaction data, force reaction data, and/or movement reaction data.

Each user AR system 104 may maintain local AR content 750, which may be embodied as AR presentations and/or time-delayed AR sensory stimulus events received from the AR server 102. For example, in embodiments in which the time-delayed AR sensory stimulus events include a timing parameter associated therewith, the AR server 102 may transmit the AR presentation and/or time-delayed AR sensory stimulus events some time prior to the time of presentation of the time-delayed AR sensory stimulus events. In such embodiments, the user AR system 104 may store the time-delayed AR sensory stimulus events as local AR content 750 until the time-delayed AR sensory stimulus events is to be presented based on, for example, the associated timing parameter.

Figure 8:
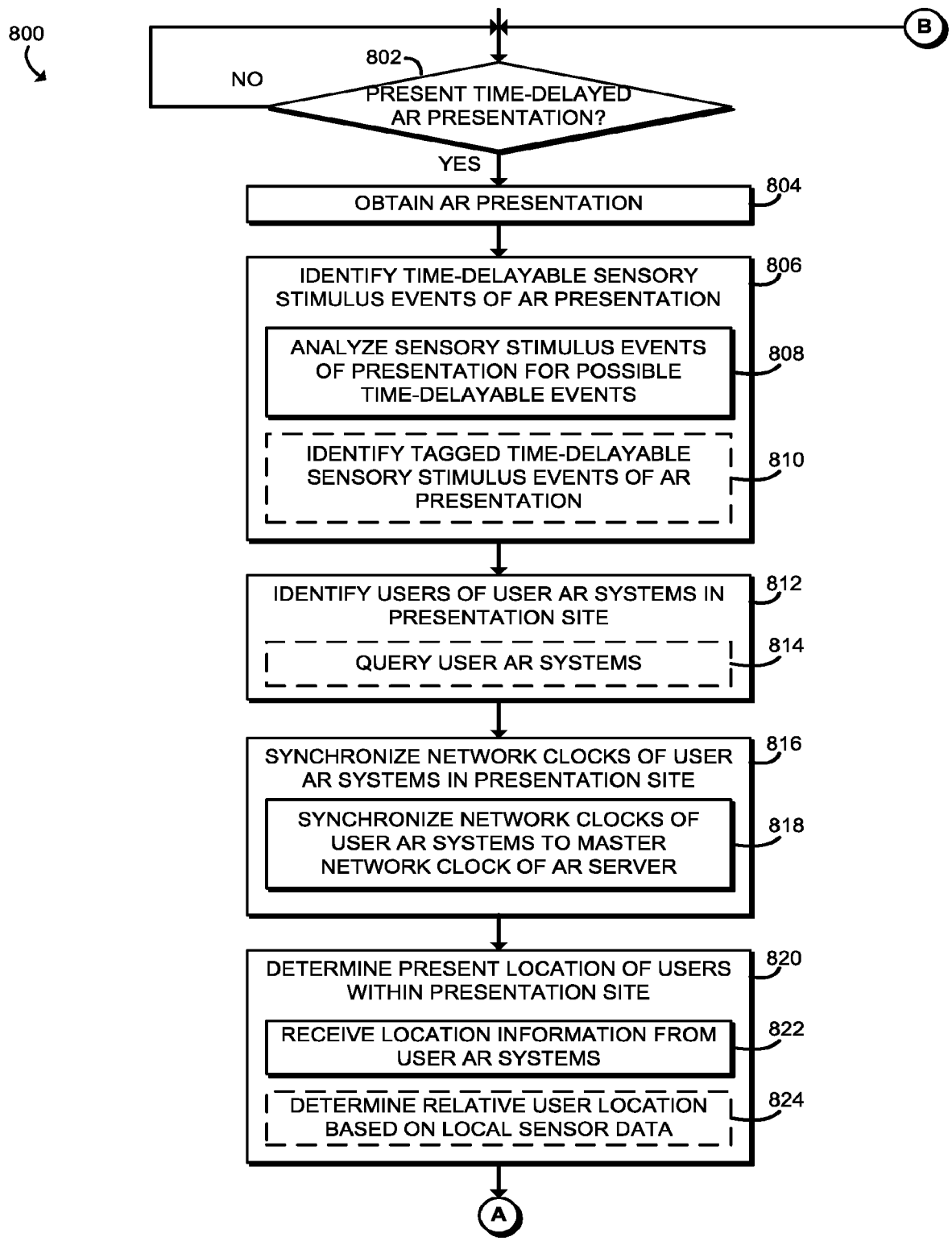
FIGS. 8 and 9 are a simplified flow diagram of at least one embodiment of a method for presenting a time-delayed augmented reality presentation that may be executed by the augmented reality server of FIGS. 4 and 6.
Figure 9:
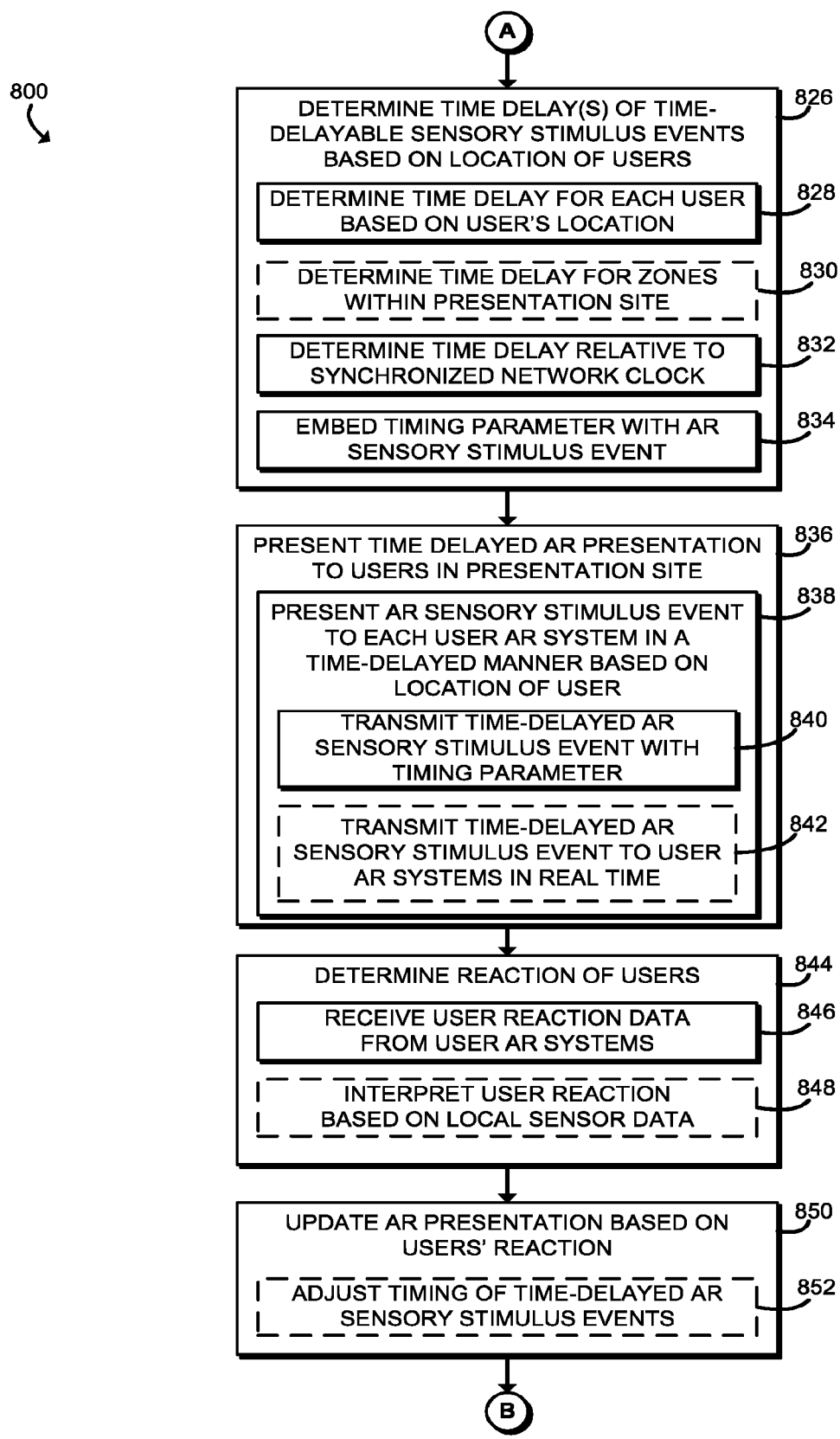

Referring now to FIGS. 8 and 9, in use, the AR server 102 may execute a method 800 for presenting a time-delayed augmented reality presentation. The method 800 begins with block 802 in which the AR server 102 determines whether to present a time-delayed AR presentation to user AR systems 104 located in the presentation site 108. If so, the method 800 advances to block 804 in which the AR server 102 obtains an AR presentation to be presented. As discussed above, the AR server 102 may store AR presentations in the AR content database 650 and retrieve such AR presentations as needed. In other embodiments, however, the AR server 102 may obtain AR presentations from other sources, such as an AR presentation server.

After the AR server 102 has obtained an AR presentation to be presented, the method 800 advances to block 806 in which the AR server 102 identifies AR sensory stimulus events included in the AR presentation that can be time delayed. To do so, in block 808, the AR server 102 may analyze the AR presentations to identify sensory stimulus events and further analyze each identified AR sensory stimulus events to determine whether the AR sensory stimulus event can be time delayed. As discussed above, the AR server 102 may utilize any suitable algorithm or methodology to identify AR sensory stimulus events that can be time-delayed based on, for example, abrupt changes of sensory stimulus present in the AR presentation, visual or audible information included in the AR presentation, and/or other criteria.

In some embodiments, as discussed above, each AR sensory stimulus event of the AR presentation that can be time delayed may be tagged or annotated. In such embodiments, the AR server 102 may identify the AR sensory stimulus events that can be timed delayed by searching for such tags or identifiers in block 810. For example, in some embodiments, the AR presentation may include embedded tags that delineate or identify AR sensory stimulus events that can be time delayed by the AR server 102.

In block 812, the AR server 102 identifies each user and/or user AR system 104 located in the presentation site 108. To do so, in block 814, the AR server 102 may query each user AR system 104 to determine whether the user AR system 104 is present and whether the user desires to participate in the AR presentation. For example, the AR server 102 may transmit a broadcast query to all user AR systems 104 located in or near the presentation site 108. In other embodiments, the participating user AR systems 104 may be pre-known or otherwise already identified and, in such embodiments, the AR server 102 may maintain a list of participating user AR systems 104.

After each participating user AR system 104 has been identified, the AR server 102 synchronizes the local network clocks 550 of each user AR system 104 in block 816. To do so, the AR server 102 may synchronize each network clock 550 with the master network clock 450 of the AR server 102 in block 818. For example, the AR server 102 may transmit clock information indicative of the master network clock 450 to each user AR system 104. Each user AR system 104 may subsequently synchronize its local network clock 550 based on the received clock information. In other embodiments, the AR server 102 may query each user AR system 104 for clock information indicative of the local network clock 550 of corresponding user AR system 104. In such embodiments, the AR server 102 may utilize the received clock information as a timing offset for determining a timing delay for the respective user AR system 104. Alternatively, the AR server 102 may determine the timing offset between the received clock information and the master network clock 450 and transmit such timing offset to the corresponding user AR system 104 to allow the user AR system 104 to synchronize its local network clock 550.

Subsequently, in block 820, the AR server 102 determines a present location of each participating user AR system 104 within the presentation site 108. To do so, in some embodiments, the AR server 102 may query each user AR system 104 and receive location information from the queried user AR systems 104 in block 822. As discussed above, such location data may be an absolute or relative location value (e.g., relative to a communication node or WiFi hotspot). Additionally or alternatively, in some embodiments in block 824, the AR server 102 may determine or infer the relative location of each participating user AR system 104 based on sensor data received from one or more local sensors 302.

After the AR server 102 has determined the location of each user AR system 104 within the presentation site 108, the method 800 advances to block 826 of FIG. 9. In block 826, the AR server 102 determines a time delay for each time-delayable AR sensory stimulus event identified in the AR presentation. To do so, the AR server 102 may determine the time delay (e.g., a value measured in temporal increments) based on the location of each user AR system in the presentation site 108 in block 828. For example, user AR systems 104 farther away from the origination point of an AR sensory stimulus event may be assigned a higher time delay value relative to those user AR systems 104 located nearer the origination point. Alternatively, in some embodiments in block 830, the AR server 102 may determine the time delay based on geographical zones assigned to the presentation site 108. In such embodiments, each user AR system 104 located in the same geographical zone is assigned the same time delay.

In block 832, the AR servers 102 determines the time delay value as a temporal value relative to the synchronized master network clock 450. Alternatively, in embodiments in which each user AR system 104 transmits clock information indicative of its local network clock 550, the determined time delay value may be relative to the local network clock 550 of the particular user AR system 104. Regardless, after the AR serves 102 determines the time delay for the AR sensory stimulus event and for each user AR system 104, the AR server may embed a timing parameter indicative of the associated time delay with the corresponding AR sensory stimulus event in block 834. As discussed below, the timing parameter may be used by the user AR system 104 to present the associated AR sensory stimulus event in a time delayed manner. For example, the timing parameter may define a reference time point at which to present the AR sensory stimulus event, which may be referenced to the master network clock 450.

After the AR server 102 has determined the timing delay for each identified time-delayable AR sensory stimulus event, the AR servers may present the time delayed presentation to the users of the user AR systems 104 located in the presentation site 108 in block 836. To do so, in block 838, the AR server 102 presents each time delayed AR sensory stimulus event to each user AR system 104 in a time-delayed manner based on the location of the corresponding user AR system 104 (i.e., the location of the user within the presentation site 108). For example, in the illustrative embodiment, the AR server 102 transmits the time-delayed AR sensory stimulus event with the determined timing parameter in block 840. The time-delayed AR sensory stimulus events may be transmitted with the AR presentation as a whole or transmitted as separate AR sensory stimulus events. However, because each AR sensory stimulus event includes the associated timing parameter, the AR server 102 may transmit the AR sensory stimulus event some amount of time prior to the presentation of the time-delayed AR presentation. Alternatively, in embodiments in which the timing parameters are not used, the AR server 102 may transmit the time-delayed sensory stimulus event to each user AR system 104 in real time in block 842. That is, in such embodiments, the AR server 102 transmits the AR sensory stimulus event at the delayed time at which the particular user AR system 104 is to present the AR sensory stimulus to the user.

After the AR server 102 has provided the time-delayed AR sensory stimulus event to each user AR system 104 in whichever manner and each user AR system 104 has presented the time-delayed AR sensory stimulus event to the corresponding user, the AR server 102 determines reactions of the users in block 844. To do so, the AR server 102 receives user reaction data from each participating user AR system 104 in block 846. The user AR systems 104 may transmit the user reaction data in response to a query received from the AR server or autonomously after presentation of the time-delayed AR sensory stimulus event. Additionally or alternatively, in some embodiments, the AR server 102 may interpret users' reactions to AR sensory stimulus events based on sensor data received from the local sensors 302 in block 848. For example, the AR server 102 may analyze video sensor data to determine user's facial reactions to an AR sensory stimulus event.

Subsequently, in block 850, the AR server 102 updates the AR presentation based on the users' reaction received in block 844. For example, in block 852, the AR server 102 may adjust the timing or amount of temporal delay of one or more time-delayed AR sensory stimulus events of the AR presentation in block 852. After any update to the AR presentation has been completed, the method 800 loops back to block 802 in which the AR server 102 determines whether to present another time-delayed AR presentation.

Figure 10:
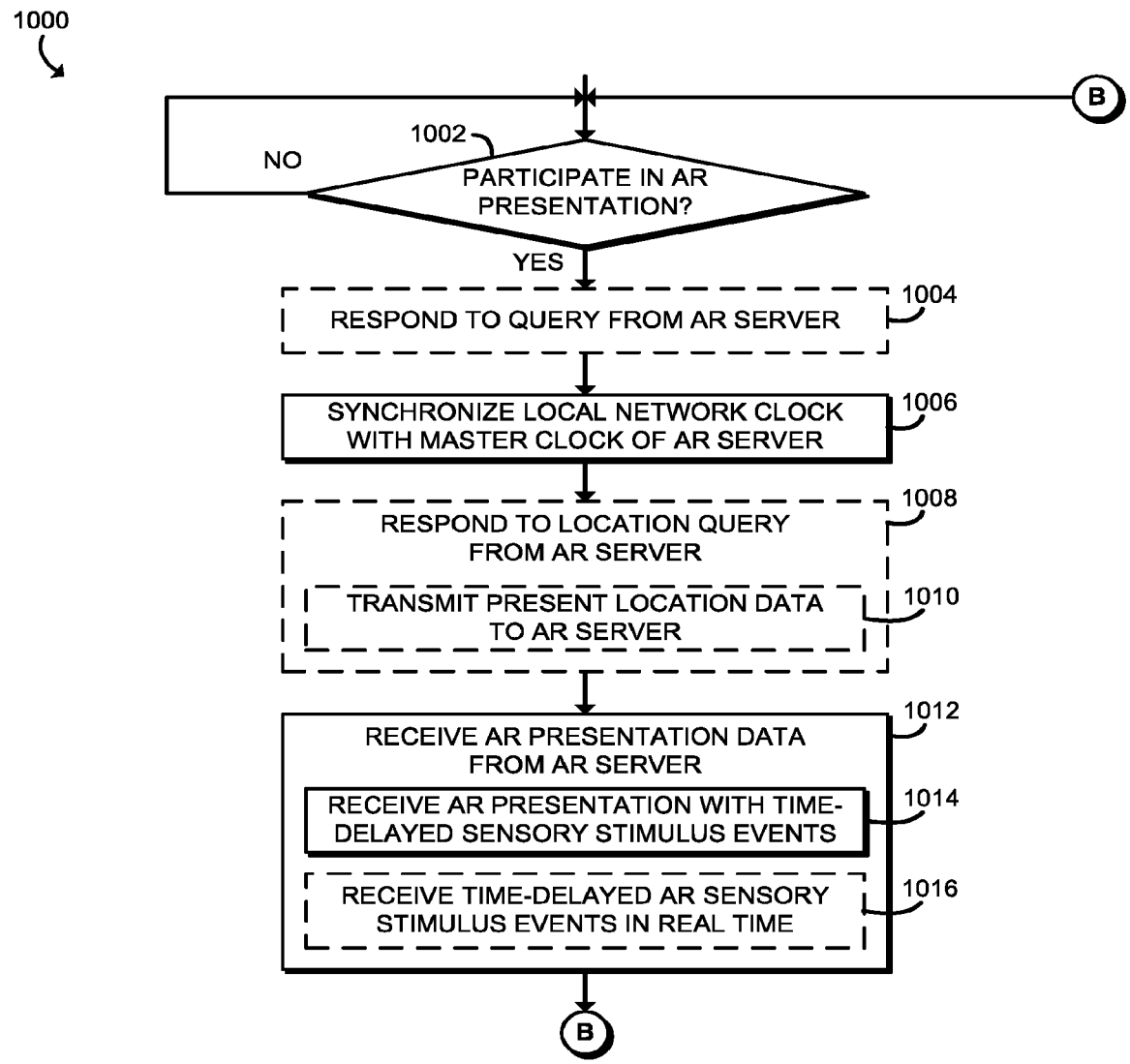
FIGS. 10 and 11 are a simplified flow diagram of at least one embodiment of a method for presenting a time-delayed augmented reality presentation that may be executed by the user augmented reality system of FIGS. 5 and 7.
Figure 11:
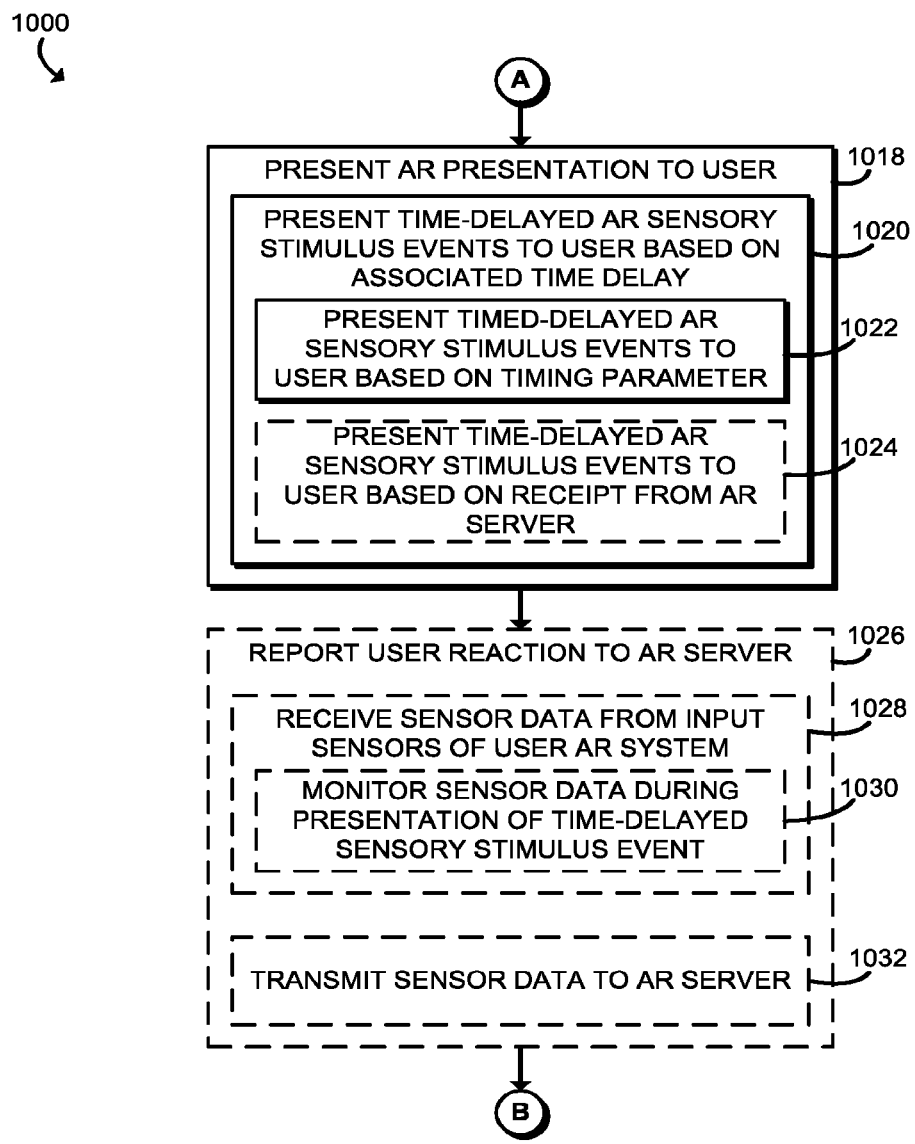

Referring now to FIGS. 10 and 11, in use, each participating user AR system 104 may execute a method 1000 method for presenting a time-delayed augmented reality presentation. The method 1000 begins with block 1002 in which the user AR system 104 determines whether to participate in the time-delayed AR presentation available from the AR server 102. For example, in some embodiments, the user AR system 104 may receive a query from the AR server 102 requesting whether the user of the user AR system 104 desires to participate. The user may actively respond to the query or have the user AR system 104 set to automatically accept or deny the query. Regardless, in such embodiments, the user AR system 104 responds to any such query in block 1004.

If the user AR system 104 is to participate in the time-delayed AR presentation, the method advances to block 1006 in which the user AR system 104 synchronizes its local network clock 550 with the master network clock 450 of the AR server 102. For example, as discussed above, the AR server 102 may transmit clock information indicative of the master network clock 450 in some embodiments. In such embodiments, the user AR system 104 may adjust its local network clock 550 based on the clock information received from the AR server 102. In other embodiments, the AR server 102 may request clock information from the user AR system 104. In such embodiments, the user AR system 104 may transmit clock information indicative of the local network clock 550 of the user AR system 104 to the AR server 102.

In some embodiments, as discussed above, the AR server 102 may transmit queries for location information to each user AR system 104. In such embodiments, the user AR system 104 may respond to the location query in block 1008. For example, in block 1010, the user AR system 104 may determine location information indicative of its present location within the AR presentation site 108 and transmit such location information to the AR server 102 in block 1010. As discussed above, the location information may be absolute (e.g., location information determined from the GPS circuit 532) or relative to a location or object within the presentation site 108 (e.g., location information determined based on triangulation or trilateration with one more WiFi hotspots or nodes).

In block 1012, the user AR system 104 receives AR presentation data from the AR server. For example, in block 1014, the user AR system 104 may receive the AR presentation, which may include one or more time-delayed sensory stimulus events. In such embodiments, each time-delayed sensory stimulus event may have a timing parameter associated or embedded therewith from which the user AR system 104 may determine a delay for which to present the AR sensory stimulus event. Alternatively, in other embodiments as discussed above, the AR server 102 may transmit each time-delayed AR sensory stimulus event in a real time (i.e., at the time at which the user AR system 104 is to present the AR sensory stimulus event).

Regardless, after the user AR system 104 has received the AR presentation data in block 1012, the method 1000 advances to block 1018 of FIG. 11. In block 1018, the user AR system 104 presents the time-delayed AR presentation the user. In doing so, in block 1020, the user AR system 104 presents the one or more time-delayed sensor stimulus events based on an associated time delay determined by the AR server 102. For example, in block 1022, the user AR system 104 may present a time-delayed sensor stimulus event to the user based on a timing parameter associated with the corresponding time-delayed sensor stimulus event. For example, the timing parameter may identify a time, based on the master network clock 450 to which the local network clock 550 of the user AR system 104 has been synchronized, at which the user AR system 104 is to present the corresponding AR sensory stimulus event. Alternatively, the timing parameter may identify a length of delay time relative to time of receipt for which the user AR system 104 should wait before presenting the AR sensory stimulus event. Alternatively, in embodiments in which a timing parameter is not used, the AR server 102 may transmit the time-delayed AR sensory stimulus event in real time. In such embodiments, the user AR system 104 is configured to promptly present the received AR sensory stimulus event to the user in block 1024.

After the user AR system 104 has presented the AR presentation and/or time-delayed AR sensory stimulus event to the user in block 1018, the method 1000 advances to block 1026 in some embodiments. In block 1026, the user AR system 104 reports the user's reaction to the time-delayed AR sensory stimulus event. To do so, in block 1028, the user AR system 104 may receive sensor data from one or more of the input sensors 510. For example, in block 1030, the user AR system 104 may monitor the input sensors 510 during the presentation of the time-delayed AR sensory stimulus event. After the user AR system 104 has collected the sensor data indicative of the user's reaction, the user AR system 104 transmits the user reaction data to the AR server 102 in block 1032. The method 1000 subsequently loops back to block 1002 of FIG. 10 in which the user AR system 104 determines whether to participate in another AR presentation.

EXAMPLES

Illustrative examples of the technologies disclosed herein are provided below. An embodiment of the technologies may include any one or more, and any combination of, the examples described below.

Example 1 includes an augmented reality (AR) server for presenting a time-delayed AR presentation, the AR server comprising a user location mapper to determine a location of a plurality of user AR systems located within a presentation site; and an AR presentation manager to (i) identify an AR sensory stimulus event of an AR presentation to be presented within the presentation site, (ii) determine a time delay of the AR sensory stimulus event for each user AR system based on the location of the corresponding user AR system within the presentation site; and (ii) present the AR sensory stimulus event to each user AR system based on the determined time delay associated with the corresponding user AR system.

Example 2 includes the subject matter of Example 1, and wherein to identify the AR sensory stimulus event comprises to analyze the AR presentation for AR sensory stimulus events to identify an AR sensory stimulus event of the AR presentation that can be time delayed.

Example 3 includes the subject matter of any of Examples 1 and 2, and wherein to identify the AR sensory stimulus event comprises to identify an AR sensory stimulus event of the AR presentation that has been tagged as capable of being time delayed.

Example 4 includes the subject matter of any of Examples 1-3, and wherein to determine a location of the plurality of user AR systems comprises to receive location information from each of the plurality of user AR systems indicative of the location of the corresponding user AR system within the presentation site.

Example 5 includes the subject matter of any of Examples 1-4, and wherein to determine a location of the plurality of user AR systems comprises to receive location information from one or more local sensors located at the presentation site, wherein the location information is indicative of a location of each of the plurality of user AR systems within the presentation site; and determine a relative location of each of the user AR systems within the presentation site based on the location information.

Example 6 includes the subject matter of any of Examples 1-5, and wherein to determine the location of the plurality of user AR systems comprises to transmit a query to each user AR system to request confirmation to participate in the AR presentation, and determine a location of a responding user AR system of the plurality of user AR systems in response to a confirmation to participate in the AR presentation received from the responding user AR system.

Example 7 includes the subject matter of any of Examples 1-6, and further including a master network clock, wherein to determine the time delay of the AR sensory stimulus event comprises to synchronize a network clock of each user AR system to the master network clock.

Example 8 includes the subject matter of any of Examples 1-7, and wherein to synchronize the network clock of each user AR system comprises to transmit clock information related to the master network clock of the AR server.

Example 9 includes the subject matter of any of Examples 1-8, and wherein to determine the time delay of the AR sensory stimulus event for each user AR system comprises to determine a time delay of the AR sensory stimulus event for each user AR system relative to the network clock of the corresponding user AR system.

Example 10 includes the subject matter of any of Examples 1-9, and wherein to determine the time delay of the AR sensory stimulus event comprises to determine a time delay of the AR sensory stimulus event for each user AR system based on a geographical zone of the presentation site in which the corresponding user AR system is located.

Example 11 includes the subject matter of any of Examples 1-10, and wherein to determine the time delay of the AR sensory stimulus event comprises to increase the time delay as a function of the distance of the corresponding user AR system relative to a reference point within the presentation site.

Example 12 includes the subject matter of any of Examples 1-11, and wherein to present the AR sensory stimulus event to each user AR system comprises to transmit the AR sensory stimulus event including time delay data that identifies time delay determined for each corresponding user AR system.

Example 13 includes the subject matter of any of Examples 1-12, and wherein to present the AR sensory stimulus event to each user AR system comprises to determine a timing parameter that identifies the time delay determined for the corresponding user AR system based on the location of the corresponding user AR system; and transmit each timing parameter to the corresponding user AR system.

Example 14 includes the subject matter of any of Examples 1-13, and wherein to present the AR sensory stimulus event to each user AR system comprises to transmit the AR sensory stimulus event at a point in time that is based on the determined time delay for the corresponding user AR system.

Example 15 includes the subject matter of any of Examples 1-14, and wherein to present the AR sensory stimulus event to each user AR system comprises to cause each user AR system to generate the AR sensory stimulus event in a time-delayed manner relative to at least one other user AR system located within the presentation site that has previously generated the AR sensory stimulus event Example 16 includes the subject matter of any of Examples 1-15, and further including a user reaction manager to determine a reaction of a user of each user AR system in response to the presentation of the AR sensory stimulus event.

Example 17 includes the subject matter of any of Examples 1-16, and wherein to determine the reaction of a user of each user AR system comprises to receive user reaction data indicative of a reaction of the user of the corresponding user AR system to the AR sensory stimulus event.

Example 18 includes the subject matter of any of Examples 1-17, and wherein to determine the reaction of a user of each user AR system comprises to interpret a reaction of the user of each user AR system to the AR sensory stimulus event based on sensor data received from a sensor local to the presentation site.

Example 19 includes the subject matter of any of Examples 1-18, and wherein the user reaction manager is further to update the AR sensory stimulus event based on the determined reaction of the user of each user AR system.

Example 20 includes the subject matter of any of Examples 1-19, and wherein to update the AR sensory stimulus event comprises to adjust the time delay of the AR sensory stimulus event for at least one user AR system based on the reaction of the user of the at least one user AR system.

Example 21 includes the subject matter of any of Examples 1-20, and wherein the AR sensory stimulus event comprises at least one of an audible sensory stimulus event, a visual sensory stimulus event, a tactile sensory stimulus event, or an olfactory sensory stimulus event.

Example 22 includes the subject matter of any of Examples 1-21, and wherein to determine the time delay of the AR sensory stimulus event for each user AR system based on the location of the corresponding user AR system within the presentation site comprises to determine the time delay based on a law of physics associated with the AR sensory stimulus event.

Example 23 includes a method for presenting a time-delayed augmented reality (AR) presentations, the method comprising identifying, by a AR server, an AR sensory stimulus event of an AR presentation to be presented within a presentation site; determining, by the AR server, a location of a plurality of user AR systems located within the presentation site; determining, by the AR server, a time delay of the AR sensory stimulus event for each user AR system based on the location of the corresponding user AR system within the presentation site; and presenting, by the AR server, the AR sensory stimulus event to each user AR system based on the determined time delay associated with the corresponding user AR system.

Example 24 includes the subject matter of Example 23, and wherein identifying the AR sensory stimulus event comprises analyzing the AR presentation for AR sensory stimulus events to identify an AR sensory stimulus event of the AR presentation that can be time delayed.

Example 25 includes the subject matter of any of Examples 23 and 24, and wherein identifying the AR sensory stimulus event comprises identifying an AR sensory stimulus event of the AR presentation that has been tagged as capable of being time delayed.

Example 26 includes the subject matter of any of Examples 23-25, and wherein determining a location of the plurality of user AR systems comprises receiving location information from each of the plurality of user AR systems indicative of the location of the corresponding user AR system within the presentation site.

Example 27 includes the subject matter of any of Examples 23-26, and wherein determining a location of the plurality of user AR systems comprises receiving, by the AR server, location information from one or more local sensors located at the presentation site, wherein the location information is indicative of a location of each of the plurality of user AR systems within the presentation site; and determining, by the AR server, a relative location of each of the user AR systems within the presentation site based on the location information.

Example 28 includes the subject matter of any of Examples 23-27, and wherein determining the location of the plurality of user AR systems comprises transmitting, by the AR server, a query to each user AR system to request confirmation to participate in the AR presentation, and determining, by the AR server, a location of a responding user AR system of the plurality of user AR systems in response to a confirmation to participate in the AR presentation received from the responding user AR system.

Example 29 includes the subject matter of any of Examples 23-28, and wherein determining the time delay of the AR sensory stimulus event comprises synchronizing, by the AR server, a network clock of each user AR system to a master network clock of the AR server.

Example 30 includes the subject matter of any of Examples 23-29, and wherein synchronizing the network clock of each user AR system comprises transmitting, by the AR server, clock information related to the master network clock of the AR server.

Example 31 includes the subject matter of any of Examples 23-30, and wherein determining the time delay of the AR sensory stimulus event for each user AR system comprises determining a time delay of the AR sensory stimulus event for each user AR system relative to the network clock of the corresponding user AR system.

Example 32 includes the subject matter of any of Examples 23-31, and wherein determining the time delay of the AR sensory stimulus event comprises determining a time delay of the AR sensory stimulus event for each user AR system based on a geographical zone of the presentation site in which the corresponding user AR system is located.

Example 33 includes the subject matter of any of Examples 23-32, and wherein determining the time delay of the AR sensory stimulus event comprises increasing the time delay as a function of the distance of the corresponding user AR system relative to a reference point within the presentation site.

Example 34 includes the subject matter of any of Examples 23-33, and wherein presenting the AR sensory stimulus event to each user AR system comprises transmitting, to each user AR system, the AR sensory stimulus event including time delay data that identifies the time delay determined for each corresponding user AR system.

Example 35 includes the subject matter of any of Examples 23-34, and wherein presenting the AR sensory stimulus event to each user AR system comprises determining, for each user AR system, a timing parameter that identifies the time delay determined for the corresponding user AR system based on the location of the corresponding user AR system; and transmitting each timing parameter to the corresponding user AR system.

Example 36 includes the subject matter of any of Examples 23-35, and wherein presenting the AR sensory stimulus event to each user AR system comprises transmitting, to each user AR system, the AR sensory stimulus event at a point in time that is based on the determined time delay for the corresponding user AR system.

Example 37 includes the subject matter of any of Examples 23-36, and wherein presenting the AR sensory stimulus event to each user AR system comprises causing each user AR system to generate the AR sensory stimulus event in a time-delayed manner relative to at least one other user AR system located within the presentation site that has previously generated the AR sensory stimulus event Example 38 includes the subject matter of any of Examples 23-37, and further including determining, by the AR server, a reaction of a user of each user AR system in response to the presentation of the AR sensory stimulus event.

Example 39 includes the subject matter of any of Examples 23-38, and wherein determining the reaction of a user of each user AR system comprises receiving, from each user AR system, user reaction data indicative of a reaction of the user of the corresponding user AR system to the AR sensory stimulus event.

Example 40 includes the subject matter of any of Examples 23-39, and wherein determining the reaction of a user of each user AR system comprises interpreting a reaction of the user of each user AR system to the AR sensory stimulus event based on sensor data received from a sensor local to the presentation site.

Example 41 includes the subject matter of any of Examples 23-40, and further including updating the AR sensory stimulus event based on the determined reaction of the user of each user AR system.

Example 42 includes the subject matter of any of Examples 23-41, and wherein updating the AR sensory stimulus event comprises adjusting the time delay of the AR sensory stimulus event for at least one user AR system based on the reaction of the user of the at least one user AR system.

Example 43 includes the subject matter of any of Examples 23-42, and wherein determining the time delay of the AR sensory stimulus event for each user AR system based on the location of the corresponding user AR system within the presentation site comprises determining the time delay based on a law of physics associated with the AR sensory stimulus event.

Example 44 includes the subject matter of any of Examples 23-43, and wherein the AR sensory stimulus event comprises at least one of an audible sensory stimulus event, a visual sensory stimulus event, a tactile sensory stimulus event, or an olfactory sensory stimulus event.

Example 45 include one or more machine-readable storage media comprising a plurality of instructions stored thereon that, when executed, causes an AR server to perform the method of any of Examples 23-44.

Example 46 includes an augmented reality (AR) server for presenting a time-delayed AR presentation, the AR server comprising means for identifying an AR sensory stimulus event of an AR presentation to be presented within a presentation site; means for determining a location of a plurality of user AR systems located within the presentation site; means for determining a time delay of the AR sensory stimulus event for each user AR system based on the location of the corresponding user AR system within the presentation site; and means for presenting the AR sensory stimulus event to each user AR system based on the determined time delay associated with the corresponding user AR system.

Example 47 includes the subject matter of Example 46, and wherein the means for identifying the AR sensory stimulus event comprises means for analyzing the AR presentation for AR sensory stimulus events to identify an AR sensory stimulus event of the AR presentation that can be time delayed.

Example 48 includes the subject matter of any of Examples 46 and 47, and wherein the means for identifying the AR sensory stimulus event comprises means for identifying an AR sensory stimulus event of the AR presentation that has been tagged as capable of being time delayed.

Example 49 includes the subject matter of any of Examples 46-48, and wherein the means for determining a location of the plurality of user AR systems comprises means for receiving location information from each of the plurality of user AR systems indicative of the location of the corresponding user AR system within the presentation site.

Example 50 includes the subject matter of any of Examples 46-49, and wherein the means for determining a location of the plurality of user AR systems comprises means for receiving location information from one or more local sensors located at the presentation site, wherein the location information is indicative of a location of each of the plurality of user AR systems within the presentation site; and means for determining a relative location of each of the user AR systems within the presentation site based on the location information.

Example 51 includes the subject matter of any of Examples 46-50, and wherein the means for determining the location of the plurality of user AR systems comprises means for transmitting a query to each user AR system to request confirmation to participate in the AR presentation, and means for determining a location of a responding user AR system of the plurality of user AR systems in response to a confirmation to participate in the AR presentation received from the responding user AR system.

Example 52 includes the subject matter of any of Examples 46-51, and wherein the means for determining the time delay of the AR sensory stimulus event comprises means for synchronizing a network clock of each user AR system to a master network clock of the AR server.

Example 53 includes the subject matter of any of Examples 46-52, and wherein the means for synchronizing the network clock of each user AR system comprises means for transmitting clock information related to the master network clock of the AR server.

Example 54 includes the subject matter of any of Examples 46-53, and wherein the means for determining the time delay of the AR sensory stimulus event for each user AR system comprises means for determining a time delay of the AR sensory stimulus event for each user AR system relative to the network clock of the corresponding user AR system.

Example 55 includes the subject matter of any of Examples 46-54, and wherein the means for determining the time delay of the AR sensory stimulus event comprises means for determining a time delay of the AR sensory stimulus event for each user AR system based on a geographical zone of the presentation site in which the corresponding user AR system is located.

Example 56 includes the subject matter of any of Examples 46-55, and wherein the means for determining the time delay of the AR sensory stimulus event comprises means for increasing the time delay as a function of the distance of the corresponding user AR system relative to a reference point within the presentation site.

Example 57 includes the subject matter of any of Examples 46-56, and wherein the means for presenting the AR sensory stimulus event to each user AR system comprises means for transmitting, to each user AR system, the AR sensory stimulus event including time delay data that identifies the time delay determined for each corresponding user AR system.

Example 58 includes the subject matter of any of Examples 46-57, and wherein the means for presenting the AR sensory stimulus event to each user AR system comprises means for determining, for each user AR system, a timing parameter that identifies the time delay determined for the corresponding user AR system based on the location of the corresponding user AR system; and means for transmitting each timing parameter to the corresponding user AR system.

Example 59 includes the subject matter of any of Examples 46-58, and wherein the means for presenting the AR sensory stimulus event to each user AR system comprises transmitting, to each user AR system, the AR sensory stimulus event at a point in time that is based on the determined time delay for the corresponding user AR system.

Example 60 includes the subject matter of any of Examples 46-59, and wherein the means for presenting the AR sensory stimulus event to each user AR system comprises means for causing each user AR system to generate the AR sensory stimulus event in a time-delayed manner relative to at least one other user AR system located within the presentation site that has previously generated the AR sensory stimulus event Example 61 includes the subject matter of any of Examples 46-60, and further including means for determining, by the AR server, a reaction of a user of each user AR system in response to the presentation of the AR sensory stimulus event.

Example 62 includes the subject matter of any of Examples 46-61, and wherein the means for determining the reaction of a user of each user AR system comprises means for receiving, from each user AR system, user reaction data indicative of a reaction of the user of the corresponding user AR system to the AR sensory stimulus event.

Example 63 includes the subject matter of any of Examples 46-62, and wherein the means for determining the reaction of a user of each user AR system comprises means for interpreting a reaction of the user of each user AR system to the AR sensory stimulus event based on sensor data received from a sensor local to the presentation site.

Example 64 includes the subject matter of any of Examples 46-63, and further comprising means for updating the AR sensory stimulus event based on the determined reaction of the user of each user AR system.

Example 65 includes the subject matter of any of Examples 46-64, and wherein the means for updating the AR sensory stimulus event comprises means for adjusting the time delay of the AR sensory stimulus event for at least one user AR system based on the reaction of the user of the at least one user AR system.

Example 66 includes the subject matter of any of Examples 46-65, and wherein the means for determining the time delay of the AR sensory stimulus event for each user AR system based on the location of the corresponding user AR system within the presentation site comprises means for determining the time delay based on a law of physics associated with the AR sensory stimulus event.

Example 67 includes the subject matter of any of Examples 46-66, and wherein the AR sensory stimulus event comprises at least one of an audible sensory stimulus event, a visual sensory stimulus event, a tactile sensory stimulus event, or an olfactory sensory stimulus event.

Example 68 includes a user augmented reality (AR) system comprising one or more output device to generate AR sensory stimuli to a user of the user AR system; a communication subsystem to receive an AR sensory stimulus event from an AR server, wherein the AR sensory stimulus event includes a timing parameter that defines a time at which the AR sensory stimulus event is to be generated by the user AR system; and an AR presentation presenter to control the one or more output devices to generate the AR sensory stimulus event based on the timing parameter of the AR sensory stimulus event.

Example 69 includes the subject matter of Example 68, and further including a network clock; and a network clock manager to synchronize the network clock with a master network clock of the AR server, wherein to generate the AR sensory stimulus event comprises to generate the AR sensory stimulus event based on the timing parameter of the AR sensory stimulus event and the network clock of the user AR system.

Example 70 includes the subject matter of any of Examples 68 and 69, and wherein the AR sensory stimulus event comprises at least one of an audible sensory stimulus event, a visual sensory stimulus event, a tactile sensory stimulus event, or an olfactory sensory stimulus event.

Example 71 includes the subject matter of any of Examples 68-70, and further including one or more input sensors to produce sensor data indicative of a reaction of the user to the AR sensory stimulus event, wherein the communication subsystem is further to transmit the sensor data to the AR server.

Example 72 includes the subject matter of any of Examples 68-71, and wherein the one or more input sensors comprise a visual sensor, an audible sensor, a tactile sensor, a proximity sensor, a conductance sensor, or a force sensor.

Example 73 includes a method for presenting an augmented reality (AR) sensory stimulus event to a user of an user AR system, the method comprising receiving, with the user AR system, an AR sensory stimulus event from an AR server, wherein the AR sensory stimulus event includes a timing parameter that defines a time at which the AR sensory stimulus event is to be generated by the user AR system; and generating, by one or more output devices of the user AR system, the AR sensory stimulus event based on the timing parameter of the AR sensory stimulus event.

Example 74 includes the subject matter of Example 73, and further including synchronizing, by the user AR system, a network clock of the user AR system with a master network clock of the AR server, wherein generating the AR sensory stimulus event comprises generating, by the one or more output devices, the AR sensory stimulus event based on the timing parameter of the AR sensory stimulus event and the network clock of the user AR system.

Example 75 includes the subject matter of any of Examples 73 and 74, and wherein generating the AR sensory stimulus event comprises generating at least one of an audible sensory stimulus event, a visual sensory stimulus event, a tactile sensory stimulus event, or an olfactory sensory stimulus event.

Example 76 includes the subject matter of any of Examples 73-75, and further including producing, by an input sensor of the user AR system, sensor data indicative of a reaction of the user to the AR sensory stimulus event; and transmitting, by the input sensor of the user AR system, the sensor data to the AR server.

Example 77 includes the subject matter of any of Examples 73-76, and wherein producing the sensor data comprises producing at least one of visual sensor data, audible sensor data, tactile sensor data, proximity sensor data, conductance sensor data, or force sensor data.

Example 78 includes one or more machine-readable storage media comprising a plurality of instructions stored thereon that, when executed, causes a system controller of a protected system to perform the method of any of Examples 74-76.

Example 79 includes a user augmented reality (AR) system comprising means for receiving an AR sensory stimulus event from an AR server, wherein the AR sensory stimulus event includes a timing parameter that defines a time at which the AR sensory stimulus event is to be generated by the user AR system; and means for generating the AR sensory stimulus event based on the timing parameter of the AR sensory stimulus event.

Example 80 includes the subject matter of Example 79, and further including means for synchronizing, by the user AR system, a network clock of the user AR system with a master network clock of the AR server, wherein the means for generating the AR sensory stimulus event comprises means for generating the AR sensory stimulus event based on the timing parameter of the AR sensory stimulus event and the network clock of the user AR system.

Example 81 includes the subject matter of any of Examples 79-80, and wherein the means for generating the AR sensory stimulus event comprises means for generating at least one of an audible sensory stimulus event, a visual sensory stimulus event, a tactile sensory stimulus event, or an olfactory sensory stimulus event.

Example 82 includes the subject matter of any of Examples 79-81, and further including means for producing sensor data indicative of a reaction of the user to the AR sensory stimulus event; and means for transmitting the sensor data to the AR server.

Example 83 includes the subject matter of any of Examples 79-82, and wherein means for producing the sensor data comprises means for producing at least one of visual sensor data, audible sensor data, tactile sensor data, proximity sensor data, conductance sensor data, or force sensor data.

What is claimed is:

1. A server to provide augmented reality (AR) presentations, the server comprising:
   memory;
   instructions; and
   at least one processor to execute the instructions to:
   identify a time-delayable AR sensory stimulus event of an AR presentation to be provided to a first user system at a first location and to a second user system at a second location;
   determine a first time delay of the AR sensory stimulus event for the first user system based on a position of the first location relative to a point of origin of the AR sensory stimulus event;
   determine a second time delay of the AR sensory stimulus event for the second user system based on a position of the second location relative to the point of origin, the second time delay different than the first time delay, the second time delay to be longer than a duration for a real-world sensory stimulus corresponding to the AR sensory stimulus event to traverse a distance between the second location and the point of origin according to laws of physics;

provide the AR sensory stimulus event to the first and second user systems to cause the first and second user systems to present the AR sensory stimulus event at different points in time based on the first and second time delays;

obtain reaction data from at least one of the first user system or the second user system, the reaction data indicative of a reaction of at least one of a first user of the first user system to the AR sensory stimulus event or a second user of the second user system to the AR sensory stimulus event; and adjust at least one of the first time delay or the second time delay for a subsequent AR sensory stimulus event based on the reaction data.

2. The server of claim 1, wherein the at least one processor is to determine the first and second time delays as a function of respective distances of the first and second locations from the point of origin with the first and second time delays increasing as the respective distances increase.

3. The server of claim 1, wherein the at least one processor is to determine a third time delay of the AR sensory stimulus event for a third user system at a third location different than the first and second locations, the third time delay being different than the first time delay based on the first location being in a different geographic zone than the third location, the third time delay being the same as the second time delay based on the second location being in the same geographic zone as the third location.

4. The server of claim 1, wherein the at least one processor is to provide the AR sensory stimulus event to the first and second user systems by transmitting (i) the AR sensory stimulus event and (ii) either a first timing parameter or a second timing parameter corresponding to the respective first and second user systems, the first and second timing parameters indicative of the corresponding first and second time delays, the first and second user systems to control a timing of presentation of the AR sensory stimulus event based on the respective first and second timing parameters.

5. The server of claim 1, wherein the at least one processor is to provide the AR sensory stimulus event to the first and second user systems by (i) transmitting the AR sensory stimulus event to the first user system at a first point in time and (ii) transmitting the AR sensory stimulus event to the second user system at a second point in time different than the first point in time, a difference between the first point in time and the second point in time based on a difference between the first time delay and the second time delay.

6. The server of claim 1, wherein the time-delayable AR sensory stimulus event is one of a plurality of AR sensory stimulus events, a subset of the AR sensory stimulus events including tags indicating the subset of the AR sensory stimulus events are time-delayable, the at least one processor to identify the time-delayable AR sensory stimulus event based on an associated one of the tags.

7. The server of claim 1, wherein the at least one processor is to determine an emotion of the at least one of the first user or the second user based on the reaction data.

8. At least one machine-readable storage device comprising instructions that, when executed, cause at least one processor to at least:

identify a time-delayable augmented reality (AR) sensory stimulus event of an AR presentation to be provided to a first user system at a first location and to a second user system at a second location;

determine a first time delay of the AR sensory stimulus event for the first user system based on a first distance from the first location to a point of origin of the AR sensory stimulus event;

determine a second time delay of the AR sensory stimulus event for the second user system based on a second distance from the second location to the point of origin, the second time delay different than the first time delay, the second time delay to be longer than a duration for a real-world sensory stimulus corresponding to the AR sensory stimulus event to traverse the second distance according to laws of physics;

provide the AR sensory stimulus event to the first and second user systems to cause the first and second user systems to present the AR sensory stimulus event at different points in time based on the first and second time delays;

obtain reaction data from at least one of the first user system or the second user system, the reaction data indicative of a reaction of at least one of a first user of the first user system to the AR sensory stimulus event or a second user of the second user system to the AR sensory stimulus event; and adjust at least one of the first time delay or the second time delay for a subsequent AR sensory stimulus event based on the reaction data.

9. The at least one machine-readable storage device of claim 8, wherein the instructions cause the at least one processor to determine the first and second time delays as a function of respective distances of the first and second locations from the point of origin with the first and second time delays increasing as the respective distances increase.

10. The at least one machine-readable storage device of claim 8, wherein the instructions cause the at least one processor to determine a third time delay of the AR sensory stimulus event for a third user system at a third location different than the first and second locations, the third time delay being different than the first time delay based on the first location being in a different geographic zone than the third location, the third time delay being the same as the second time delay based on the second location being in the same geographic zone as the third location.

11. The at least one machine-readable storage device of claim 8, wherein the instructions cause the at least one processor to provide the AR sensory stimulus event to the first and second user systems by transmitting (i) the AR sensory stimulus event and (ii) either a first timing parameter or a second timing parameter corresponding to the respective first and second user systems, the first and second timing parameters indicative of the corresponding first and second time delays, the first and second user systems to control a timing of presentation of the AR sensory stimulus event based on the respective first and second timing parameters.

12. The at least one machine-readable storage device of claim 8, wherein the instructions cause the at least one processor to provide the AR sensory stimulus event to the first and second user systems by (i) transmitting the AR sensory stimulus event to the first user system at a first point in time and (ii) transmitting the AR sensory stimulus event to the second user system at a second point in time different than the first point in time, a difference between the first point in time and the second point in time based on a difference between the first time delay and the second time delay.

13. The at least one machine-readable storage device of claim 8, wherein the time-delayable AR sensory stimulus event is one of a plurality of AR sensory stimulus events, a subset of the AR sensory stimulus events including tags indicating the subset of the AR sensory stimulus events are time-delayable, the instructions to cause the at least one processor to identify the time-delayable AR sensory stimulus event based on an associated one of the tags.

14. An apparatus to present augmented reality (AR) presentations, the apparatus comprising:
  means for determining a first location of a first user system and a second location of a second user system; and
  means for managing an AR presentation, the AR presentation managing means to:
    identify a time-delayable AR sensory stimulus event of an AR presentation to be provided to the first and second user systems;
    determine a first time delay of the AR sensory stimulus event for the first user system based on a position of the first location relative to a point of origin of the AR sensory stimulus event;
    determine a second time delay of the AR sensory stimulus event for the second user system based on a position of the second location relative to the point of origin, the second time delay different than the first time delay, the second time delay to be longer than a duration for a real-world sensory stimulus corresponding to the AR sensory stimulus event to traverse a distance between the second location and the point of origin according to laws of physics;
    provide the AR sensory stimulus event to the first and second user systems to cause the first and second user systems to present the AR sensory stimulus event at different points in time based on the first and second time delays;
    obtain reaction data from at least one of the first user system or the second user system, the reaction data indicative of a reaction of at least one of a first user of the first user system to the AR sensory stimulus event or a second user of the second user system to the AR sensory stimulus event; and
    adjust at least one of the first time delay or the second time delay for a subsequent AR sensory stimulus event based on the reaction data.

15. The apparatus of claim 14, wherein the AR presentation managing means is to determine the first and second time delays as a function of respective distances of the first and second locations from the point of origin with the first and second time delays increasing as the respective distances increase.

16. The apparatus of claim 14, wherein the AR presentation managing means is to determine a third time delay of the AR sensory stimulus event for a third user system at a third location different than the first and second locations, the third time delay being different than the first time delay based on the first location being in a different geographic zone than the third location, the third time delay being the same as the second time delay based on the second location being in the same geographic zone as the third location.

17. The apparatus of claim 14, wherein the AR presentation managing means is to provide the AR sensory stimulus event to the first and second user systems by transmitting (i) the AR sensory stimulus event and (ii) either a first timing parameter or a second timing parameter corresponding to the respective first and second user systems, the first and second timing parameters indicative of the corresponding first and second time delays, the first and second user systems to control a timing of presentation of the AR sensory stimulus event based on the respective first and second timing parameters.

18. The apparatus of claim 14, wherein the AR presentation managing means is to provide the AR sensory stimulus event to the first and second user systems by (i) transmitting the AR sensory stimulus event to the first user system at a first point in time and (ii) transmitting the AR sensory stimulus event to the second user system at a second point in time different than the first point in time, a difference between the first point in time and the second point in time based on a difference between the first time delay and the second time delay.

19. The apparatus of claim 14, wherein the time-delayable AR sensory stimulus event is one of a plurality of AR sensory stimulus events, a subset of the AR sensory stimulus events including tags indicating the subset of the AR sensory stimulus events are time-delayable, the AR presentation managing means to identify the time-delayable AR sensory stimulus event based on an associated one of the tags.

* * * * *